(12) United States Patent
Uniacke et al.

(10) Patent No.: US 6,223,219 B1
(45) Date of Patent: *Apr. 24, 2001

(54) TRAIL MANAGEMENT ACROSS TRANSPORT FUNCTIONALITY OF LARGE AND COMPLEX TELECOMMUNICATIONS NETWORKS

(75) Inventors: Mark Uniacke, Hatfield; Nigel Robert Davis, Edgeware, both of (GB)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,742

(22) Filed: Jan. 28, 1998

(30) Foreign Application Priority Data

Dec. 10, 1997 (GB) .................................................. 9726096

(51) Int. Cl.[7] .......................... G06F 15/173; G06F 15/16
(52) U.S. Cl. ........................ 709/223; 709/201; 709/202; 709/220; 709/224; 707/8; 707/10; 707/102; 707/201; 707/202
(58) Field of Search ................................... 709/201–203, 709/220, 223–226, 238; 707/3–4, 8–10, 100–104, 200–205; 705/1–3, 8

(56) References Cited

U.S. PATENT DOCUMENTS

| | | | |
|---|---|---|---|
| 5,384,768 | 1/1995 | Fujii | 370/14 |
| 5,550,976 | * 8/1996 | Henderson et al. | 709/201 |
| 5,734,817 | * 3/1998 | Roffe et al. | 707/202 |
| 5,758,150 | * 5/1998 | Bell et al. | 707/10 |
| 5,799,322 | * 8/1998 | Mosher, Jr. | 707/202 |
| 5,842,173 | * 11/1998 | Strum et al. | 705/1 |
| 5,842,210 | * 11/1998 | Chen et al. | 707/10 |
| 5,867,821 | * 2/1999 | Ballantyne et al. | 707/10 |
| 5,956,719 | * 9/1999 | Kudo et al. | 707/10 |
| 6,122,630 | * 9/2000 | Strickler et al. | 707/8 |

FOREIGN PATENT DOCUMENTS

| | | | |
|---|---|---|---|
| 0635958A2 | 1/1995 | (EP) | H04L/12/24 |
| 2299729 | 10/1996 | (GB) | H04Q/3/00 |
| WO 95/34973 | 12/1995 | (WO) | H04L/12/24 |
| WO 97/23101 | 6/1997 | (WO) | H04Q/3/00 |

* cited by examiner

*Primary Examiner*—Zarni Maung
*Assistant Examiner*—Bharat Barot
(74) *Attorney, Agent, or Firm*—Lee, Mann, Smith, McWilliams, Sweeney & Ohlson

(57) ABSTRACT

A trail management system for a transport network comprises a database storing data describing each of a plurality of actual and intended/planned trails within a network. Each trail is described in terms of a state model, in which the trail is recorded as being in one of a plurality of stable states, e.g. ready for service, not ready for service, existing in the network but not fully recorded in the network management system, or assigned for deletion from the network. The trail data is modified by a set of automatic processes, by means of which a trail data may transition between stable states. Each trail data may adopt one of a plurality of sub-states, e.g. fully provisioned, incomplete, in conflict with another trail, inconsistent with another trail, unprovisioned, or unsupported by network resources. The network management system learns of actual existing trails within the network and checks for consistency of actual trails with stored trail data.

20 Claims, 20 Drawing Sheets

TRAIL MANAGEMENT ACROSS TRANSPORT FUNCTIONALITY OF LARGE AND COMPLEX TELECOMMUNICATIONS NETWORKS

FIELD OF THE INVENTION

The present invention relates to communications networks, and particularly although not exclusively to the management of transport entities within a layered telecommunications transport network.

BACKGROUND TO THE INVENTION

A conventional communications network, for example a broadband communications network comprises a plurality of physical resources in the form of network elements, eg switches, cross connects, regenerators, repeaters, transmission links such as fiber optic links or coaxial cable links, operating under control of a plurality logical resources, eg transport protocols, and local controls associated with individual physical resources. An example of a generic representation of a communications network is illustrated schematically in FIG. 1 herein, in which the physical resources of a core network are located at a plurality of nodes 100 and links 101 distributed over a geographical area. For a network operator to maintain control of a communications network for its operation, administration and maintenance, a management system is maintained which stores information describing the physical and logical resources within the network. One or more management systems may reside at a centralized location, eg a network controller 102, or different management systems may be situated at a plurality of network controllers at different locations. The management system stores data describing each individual network element in a communications network and has one or more management applications which use the data to manage various aspects of the network, eg operation, administration, and maintenance of the network. A conventional communications network may comprise of the order of hundreds of individual network elements, eg switches, cross connects, regenerators, each of which contains of the order of tens to hundreds of cards, having processors, line terminations, buffers, registers, switch fabrics, etc. each card containing of the order of hundreds of individual components. In general, a conventional communications network may comprise a multitude of different legacy equipment types of different proprietary manufacture, each of which has its own particular internal configuration and offers its own specific capabilities.

International Telecommunications Union (ITU-T) recommendation G.805 of November 1995, (available from International Telecommunication Union, General Secretariat, Sales Service, Place de Nation, CH 1211, Geneva 20, Switzerland), sets out a functional architecture for telecommunications transport networks in a technology independent manner. A generic functional architecture is set out as a basis for a harmonized set of functional architecture recommendations for broadband transport network including asynchronous transfer mode (ATM), synchronous digital hierarchy (SDH) and plesiochronous digital hierarchy (PDH), as well as a corresponding set of recommendations for management, performance analysis and equipment specification for such transport networks. In general, in known transport networks circuit switched communications are made on an end to end basis over a plurality of network entities. In this specification, by circuit switched, it is meant that the network reserves part of its resources for the purpose of supporting an end to end communication, for the duration of that communication, whether those resources are used or not.

Referring to FIG. 2 herein, there is illustrated a simple example of a trail of a circuit switched communication over part of a communications transport network. A transport network is defined in recommendation G.805 as "the functional resources of the network which conveys user information between locations". In recommendation G.805, a trail is defined as "a transport entity which consists of an associated pair of unidirectional trails capably of simultaneously transferring information in opposite directions between their respective inputs and outputs". A unidirectional trail is defined as a "transport entity" responsible for the transfer of information from the input of a trail termination source to the output of a trail termination sink. The integrity of the information transfer is monitored. It is formed by combining trail termination functions and a network connection. A transport entity is defined as "an architectural component which transfers information between its inputs and outputs within a layer network. A layer network is defined as "a topological component that includes both transport entities and transport processing functions that describe the generation, transport and termination of a particular characteristic information. A connection is defined as "a transport entity which consists of an associated pair of uni-directional connections capable of simultaneously transferring information in opposite directions between their respective inputs and outputs. A uni-directional connection is defined as "a transport entity which transfers information transparently from input to output".

In FIG. 2 herein, there is illustrated schematically a plurality of transport entities 200, 201, 202, 203, 204 in a communications network comprising network elements eg switches, cross connects, links, supporting an end to end trail between first and second trail termination points 205, 206. The trail is carried over a plurality of connections, which connect the transport entities to each other. Connections between transport entities terminate at a plurality of connection termination points (CTP) within the transport entities. The generalized trail as illustrated in FIG. 2 herein, incorporates different trails in different transport protocols. For example, virtual paths and virtual circuits in asynchronous transfer mode constitute trails within the meaning of ITU-T Recommendation G.805. ATM cells may be carried within a virtual path within SDH frames over an SDH trail.

Within a layered network protocol trails occur within layers. Trails can occur at a plurality of different layers, however each trail is always contained within its own layer. In a large network, comprising tens to hundreds of network elements, management of end to end trails poses a highly complex problem and poses difficulties in the practical implementation of setting up and tearing down of trails. The concept of trail management is mentioned in recommendation G.805 in which a trail management process is defined as "configuration of network resources during network operation for the purposes of allocation, reallocation and routing of trails to provide transport to client networks." Conventionally, for creation of a trail across a network it is known for several network operators, at several network controllers controlling different sections of the network, to each set up one or more connections within sections of the network which they control. To achieve a trail over a large number of transport entities, a network operator wishing to set up a trail may need to contact, by means of a telephone call or a fax, other network operators having control of other parts of the network across which a trail may pass, and coordinate the setting up of a trail by verbal or fax communication with the other human network operators.

In conventional prior art network management systems, it is known to keep a master database which always overwrites whatever connections exist in the real network under management. Thus, if a network operator makes changes to connections or trails in a network by configuring an individual network element directly, the conventional network management system database will attempt to overwrite any changes made at the network element level, regardless of whether the network operator intended those changes to the network element or not. Further, the known network management systems do not provide an ability to draw configuration and connectivity information from the real network, and do not compare such information with the information kept in the master database.

Prior art network management systems either represent network configurations which a network operator plans at a network controller, and implements those configurations irrespective of existing configurations of a network, or provide a network operator with data describing actual network configurations, without taking into account or making provision for a network operator's planned or intended present and future configurations of the network.

SUMMARY OF THE INVENTION

One object of the present invention is to provide improved trail management capability across transport functionality of large and complex telecommunications networks.

According to one aspect of the present invention there is provided a method of managing a plurality of communications trails, said method comprising:

maintaining a database describing said plurality of trails in which each said trail is represented by a corresponding respective trail data describing at least one of a plurality of states applicable to said trail.

Specific implementations of the present invention include a database representation of actual and intended trails within a network. The database may be updated periodically, or continuously, with the object of maintaining in the database a true representation of actual and intended trails throughout the network.

Preferably, the method includes for individual ones of said trails, applying a transition to a said corresponding respective trail data from describing one of said plurality of states, to describing another of said plurality of states.

Said method may comprise the step of applying a transition to said trail data from describing one of said plurality of states to describing another of said plurality of states, wherein a said transition between states is made in response to instructions input from a graphical user interface.

Specific implementations of the present invention may provide data describing trails, from which a network management system may display (eg on a graphical user interface) representations of trails on a network map display to allow a network operator to compare actual trails in a network with trails built or intended to be built by the network operator.

Said method may comprise the step of applying a transition to said trail data from describing one of said plurality of states to describing another of said plurality of states, wherein a said transition is made in response to data received from at least one transport entity.

Preferably, a said trail data comprises data describing a stable state, in which state said trail data may reside for an indefinite period of time.

Preferably, a said state applicable to a trail is selected from the following set:

a state representing a condition in which said trail is provisioned in a network;

a state representing a condition in which said trail is unprovisioned in a network;

a state representing a condition in which said trail is supporting at least one client trail;

a state representing a condition in which said trail is present in a network, but which has not been accepted or rejected by a network management system.

Preferably, said method comprises implementing said database as a plurality of trail objects, each said trail object representing a corresponding trail, and representing a said trail state as an attribute of a said object.

For each said trail, said corresponding trail data may represent a condition of a plurality of connections of said trail.

A said trail data representing a corresponding respective said trail may describe: a sub-state of each of a plurality of connections comprising said trail; and a sub-state of said trail.

A said trail data may describe at least one trail sub-state applicable to a said trail, wherein a said trail sub-state is selected from the set:

a sub-state describing that no other sub-state exists;

a sub-state describing an incomplete trail;

a sub-state describing a trail which conflicts with another trail;

a sub-state describing a trail which the underlying physical resources are not consistent with each other;

a sub-state describing a trail which is not fully provisioned in a network;

a sub-state describing a trail, details of which are present in the database, where the network physical resources supporting that trail are not communicable with said database.

A said trail data may describe a trail sub-state describing a provisioned trail.

A said trail data may describe at least one connection sub-state applicable to a connection comprising a said trail, wherein a said connection sub-state is selected from the set:

a sub-state describing a provisioned connection;

a sub-state describing an incomplete connection;

a sub-state describing a connection which conflicts with another connection;

a sub-state describing a connection which lacks support of physical resources;

a sub-state describing a connection which is not provisioned in a network;

a sub-state describing a connection supported by network physical resources not described in said database.

According to a second aspect of the present invention there is provided a communications network management system, a method of maintaining management information describing a plurality of end to end trails, said method comprising the steps of:

maintaining trail data describing a plurality of actual network trails; and maintaining trail data describing a plurality of planned trails.

Said trail data describing a plurality of actual network trails may be determined from data received from one or a plurality of network elements.

The status of trails within the network may be periodically and/or continuously learnt via an ongoing audit process, which updates the database according to the specific implementation of the present invention on an ongoing basis. Discrepancies between actual and intended trail configurations may be recognized by the database.

Where a said trail data describing an actual network trail is received from at least one network element it may be subject to an accept/reject decision by said network management system for either accepting said trail or rejecting said trail for management.

Specific implementations of the present invention may enable a network operator to convert an intended trail into an actual trail, and/or to be able to accept an actual trail in a network as an intended trail. The network operator may, on discovering trails present in the network, decide to accept those trails. Using specific implementations of the present invention, a network operator may activate provisioning of trails learnt from the network.

Said data describing a plurality of planned trails may be input from a user interface.

The invention includes a network management system capable of managing a plurality of end to end trails, said network management system comprising a database arranged to store data representing said plurality of trails, wherein each said trail is represented by a corresponding trail data describing at least one of a plurality of possible states relating to said trail.

Said network management system preferably comprises an interface capable of receiving signals describing an existing network trail.

Said network management system preferably comprises an interface capable of receiving signals describing a de-enrollment of a network trail.

Said network management system preferably comprises an interface capable of receiving signals describing a network connection.

Preferably said database comprises, for each of a plurality of trails, a corresponding respective trail object, and said states are represented as attributes of said trail object.

The invention includes a network management system capable of maintaining management information describing a plurality of trails, said network management system comprising:

at least one element controller means capable of controlling a plurality of network elements by sending and receiving signals over an operations, administration and maintenance channel;

a network controller capable of communicating with said element controller for sending and receiving messages concerning said plurality of trails, said network controller comprising a database arranged to store data describing said plurality of trails, wherein each said trail is represented by a corresponding trail data describing at least one of a plurality of possible states relating to said trail.

Preferably said network controller performs a trail audit process for checking states of all trails managed by said system by:

sending a request signal to said element controller to request a list of all network trails supported by a plurality of network elements controlled by said element controller;

said element controller issuing interrogation signals over an operations, administration and maintenance channel for interrogation of a plurality of network elements;

said element controller recovering a plurality of response signals describing trails supported by said network elements; and said element controller sending to said network controller signals describing a plurality of network trails supported by said network elements controlled by said element controller.

Specific implementations of the present invention allow for the fact that a network operator may need to make local configuration of network elements intentionally, and without attempting to overwrite any such local changes to network elements, unless authorized to do so by a network operator.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

In the following discussion, a best mode implementation of the invention is described with reference to synchronous digital hierarchy (SDH) systems. However, it will be understood that the scope of the invention is not restricted to SDH systems, but extends over any network of physical and logical resources in the telecommunications or computer networks domains, having a management information system. Networks operating asynchronous transfer mode (ATM), synchronous optical network (SONET), integrated service digital network (ISDN) and SDH are specific examples of such networks. However, the invention is not restricted to networks operating these specific protocols.

Figure 1:
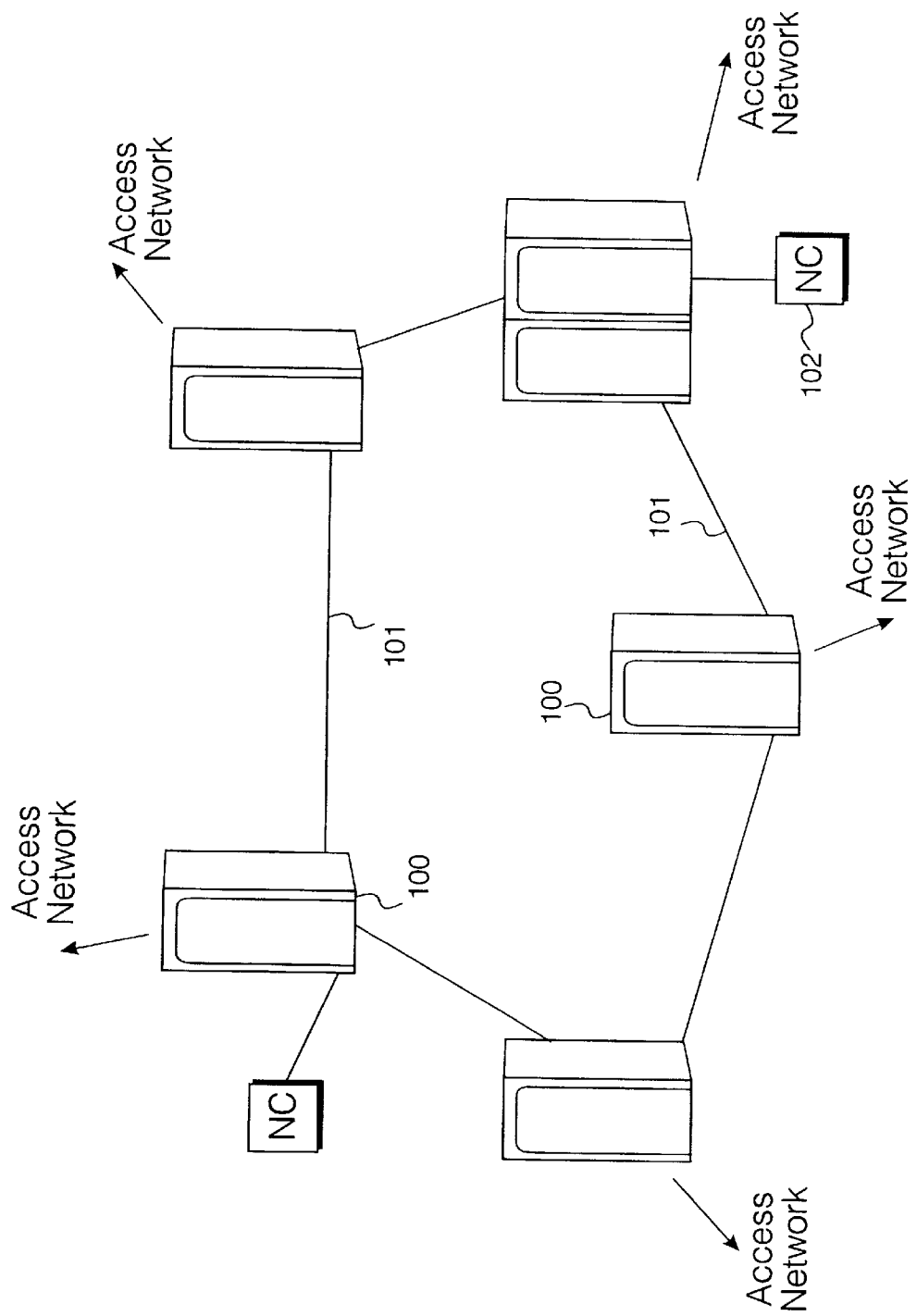
FIG. 1 illustrates schematically a representation of a generic communications network.
Figure 2:
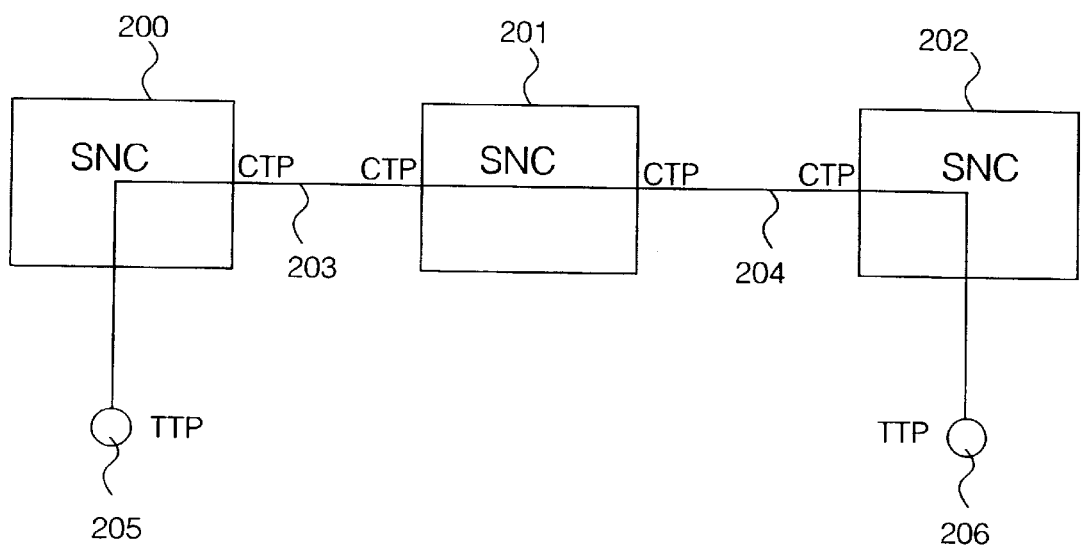
FIG. 2 illustrates a simple example of a trail of a circuit switched communication over part of communications transport network.
Figure 3:
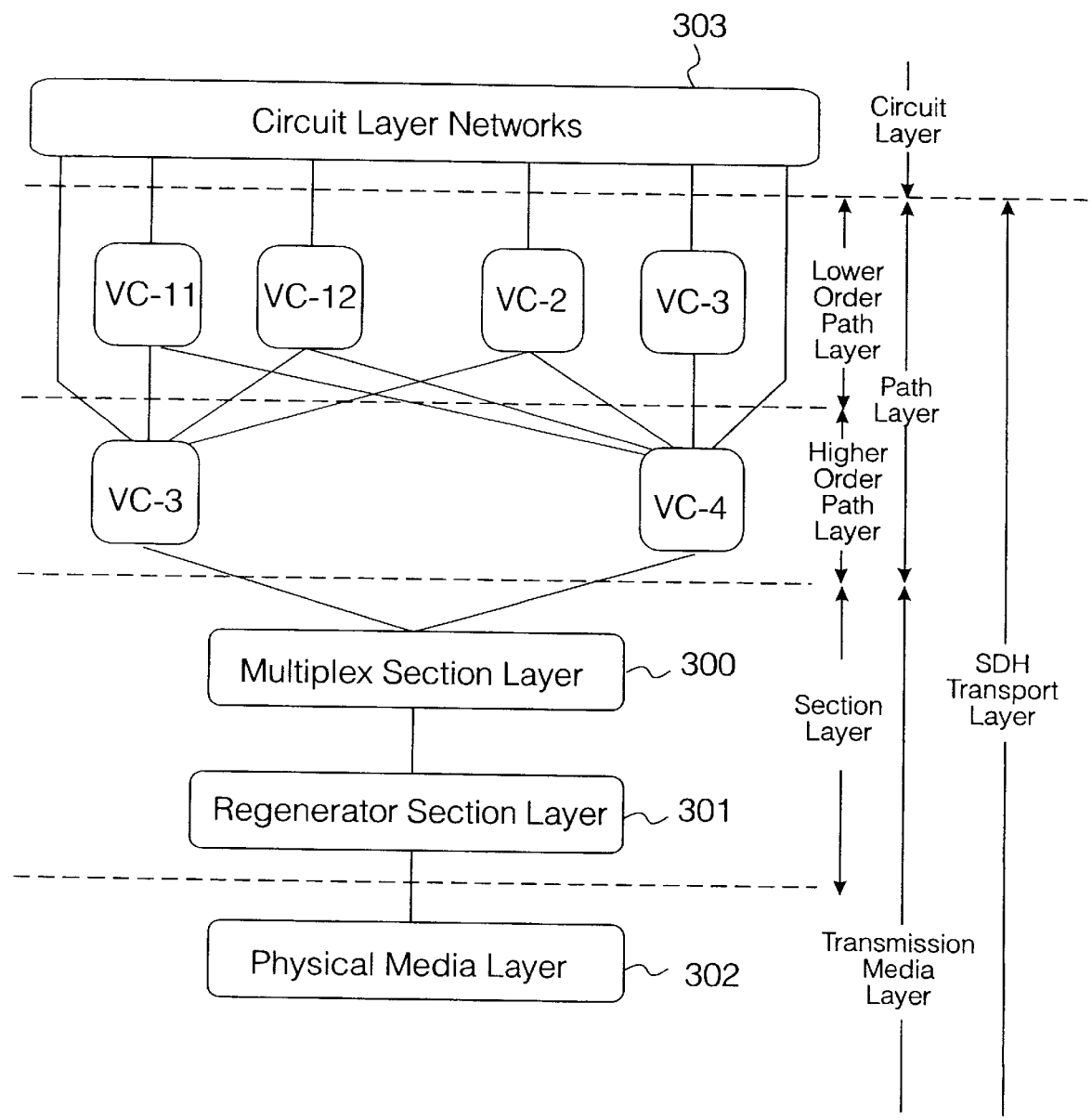
FIG. 3 illustrates schematically a representation of the prior art synchronous digital hierarchy based transport network layered model according to international recommendation ITU-T G.803.

ITU-T recommendation G.803 deals with the architecture of SDH transport networks and defines an SDH based transport network layered model as illustrated in FIG. 3 herein. The G.803 model uses a functional approach to the description of architectures based on the concept of a number of SDH functional layers, and the concept of partitioning within a layer for defining administrative domains and boundaries. Physically, a conventional SDH network is constructed from a plurality of physical resources, for example network elements such as exchanges, multiplexers, regenerators, and cross connects. The network elements are connected together and provide a transmission media layer, including a section layer comprising multiplex section layer 300, and a regenerator section layer 301, and a physical media layer 302. Circuit switched traffic is routed over the physical resources in a circuit layer 303 which is carried by the SDH transport layers.

Figure 4:
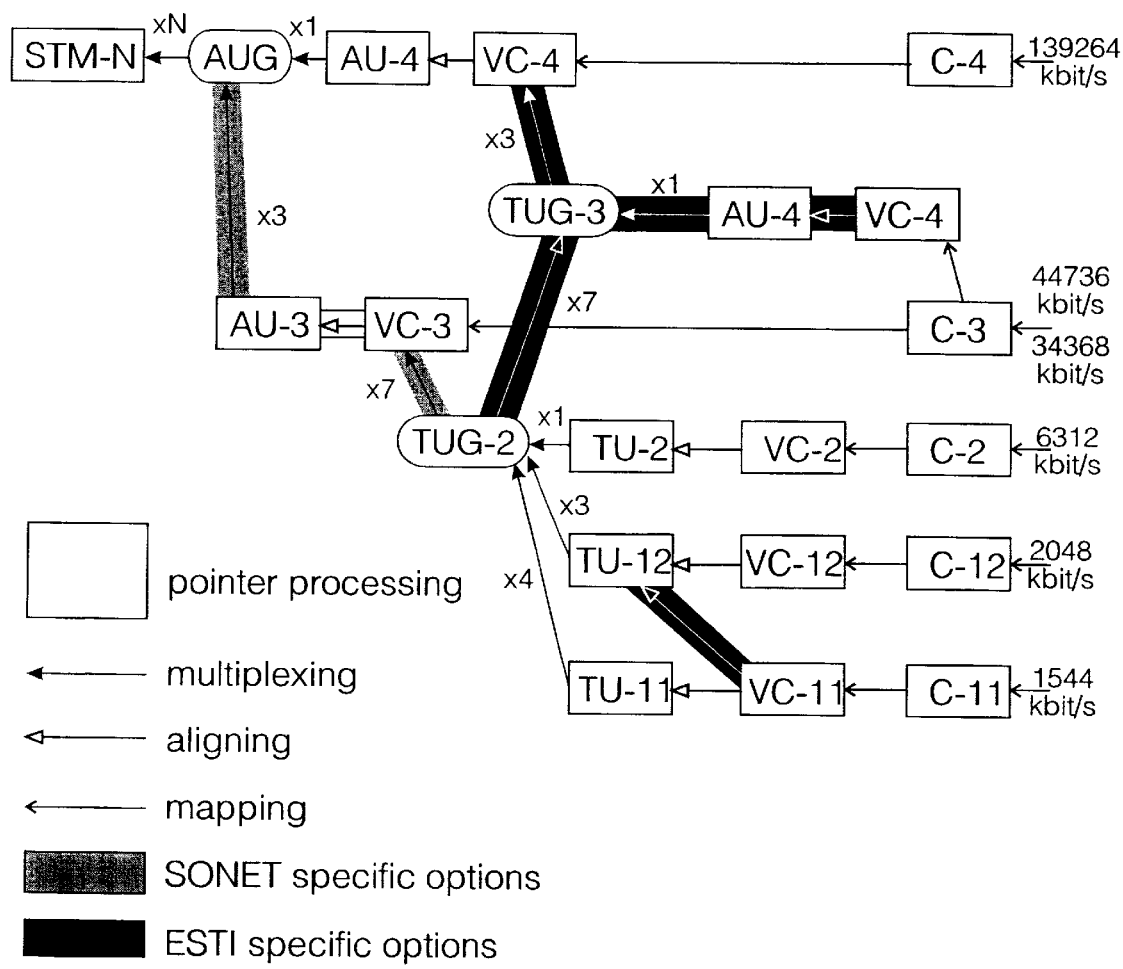
FIG. 4 illustrates schematically a prior art multiplexing structure of the known synchronous digital hierarchy transport model.

The SDH multiplexing structure is illustrated schematically in FIG. 4 herein, illustrating also synchronous optical network (SONET) multiplexing options, and European Telecommunications Standards Institute (ETSI) multiplexing options. The SDH transport layers comprise, in addition to the physical media layer and section layer, a plurality of higher order path layers, for example carried by virtual containers VC-3, VC-4, and a plurality of lower order path layers, for example carried by virtual containers VC-2, VC-3, VC-11, VC-12.

Data is carried between network elements which are geographically separated by large distances at relatively high data rates, eg 155 Mbits/s. Circuit switched connections, referred to as a circuit layer 301 in recommendation G.803 are transported across the SDH network by encapsulating bit streams comprising the circuit switched connections into different virtual containers (VCs) which are multiplexed together for transmission at higher order bit rates.

Within the physical resources, circuit switched traffic follows paths and trails at various multiplex levels. Connections are terminated at connection termination points (CTPs), and trails are terminated at trail termination points (TTPs) within physical resources. For example, within a communications network, there may be a restricted number of network elements which are capable of processing voice data. Operations on voice data at a voice level may be performed within those particular network elements. However, to transport traffic data between those network elements, there must be further transmission, such as provided by the SDH virtual container system. Thus, where a voice connection is to be made between geographically disparate network elements A and B, the connection may be routed via intermediate network elements D, E, F, G etc which may be in the VC-12 layer. However, the VC-12 layer itself, to connect between intermediate network elements E, F may need to be multiplexed into a higher bitrate layer, eg the VC-4 layer.

Figure 5:
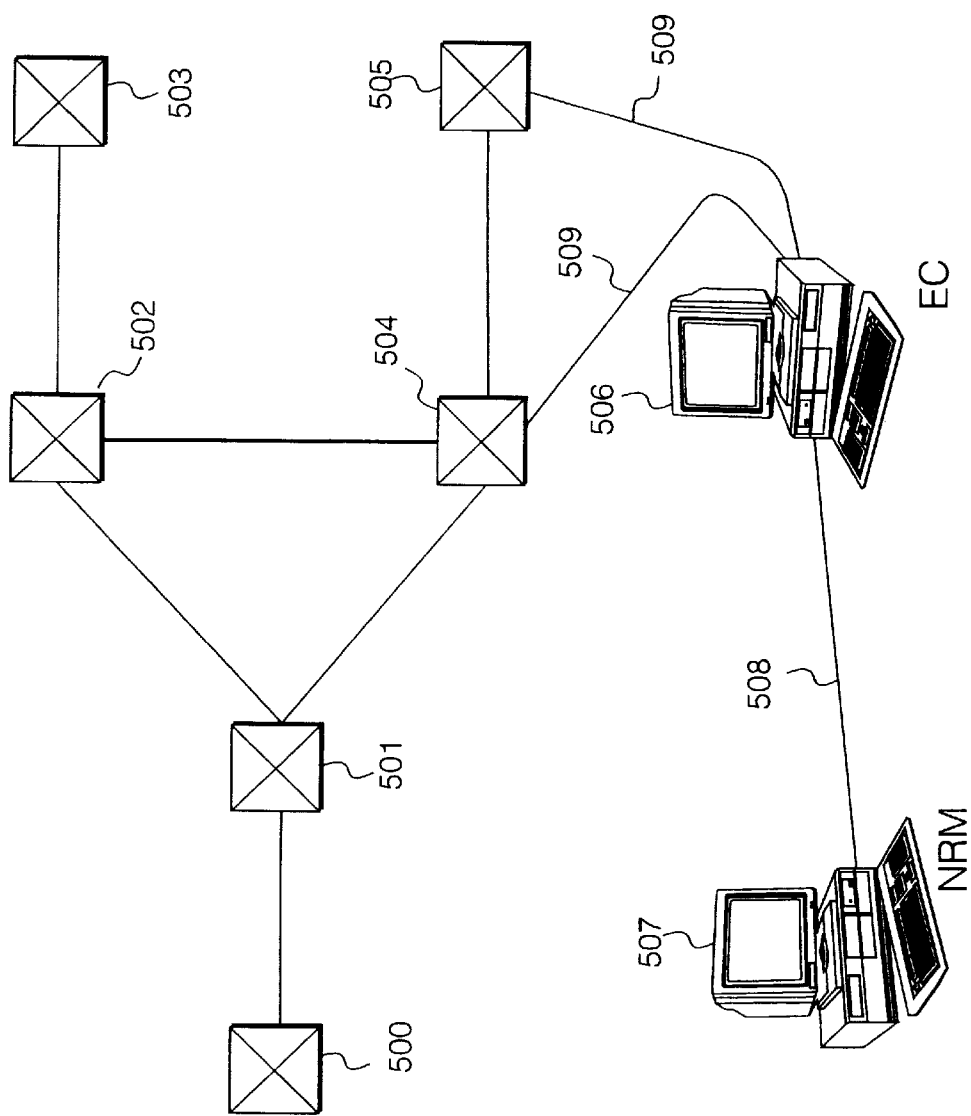
FIG. 5 illustrates schematically a section of a communications network and a network management system comprising an element controller and a network resource manager, according to a specific implementation of the present invention.

Referring to FIG. 5 herein, there is illustrated schematically a section of an SDH communications network comprising a plurality of network elements 500–505 operating under control of an element controller 506 and managed by a network controller, referred to herein as network resource manager 507 according to a specific implementation of the present invention. The element controller communicates with the plurality of network elements via an opertations administration and control channel 509, eg using a conventional network management protocol, for example the known common management information service element (CMISE) protocol, and the element controller communicates with the network resource manager 507 via a conventional protocol for example the transmission control protocol/internet protocol (TCP/IP) over a transmission link 508. The network resource manager 507 implements control of the network by implementing operations, administration and management operations of the network elements, through one or a plurality of element controllers 506.

Figure 6:
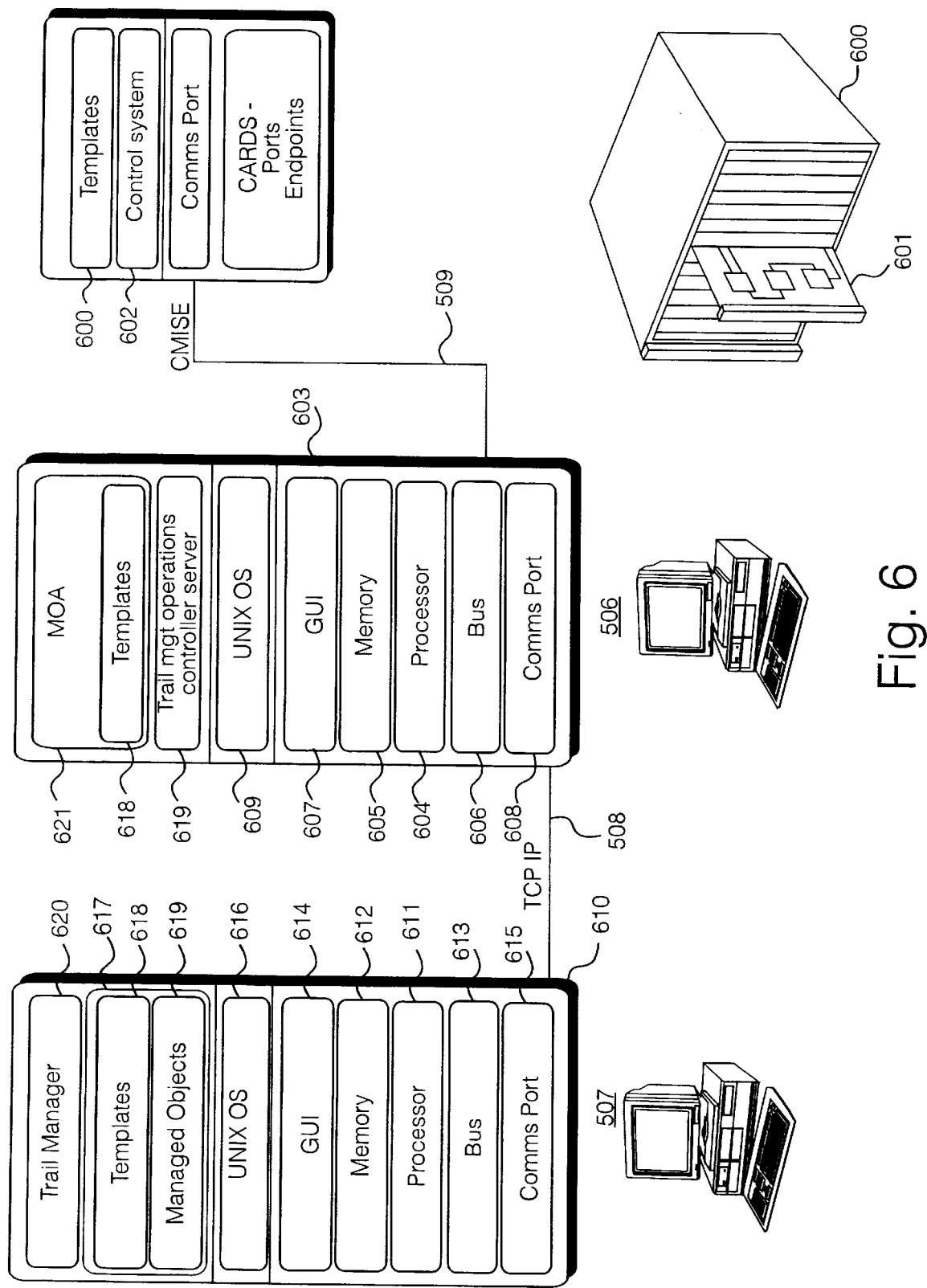
FIG. 6 illustrates schematically components of the element controller and the network resource manager of FIG. 5 herein.

Referring to FIG. 6 herein, there is illustrated schematically construction of a typical network element 600, element controller 506 and network resource manager 507. Network element 600, for example a multiplexer or cross connect, comprises a casing or cabinet having one or a plurality of shelves, each shelf containing a plurality of cards 601. The cards contain processors, switch fabrics, line terminations etc depending upon the type of network element, and are connected to each other via a data bus. In the case of an SDH multiplexer, each card may support a number of physical ports. Each port supports a plurality of connections. The network element is provided with a local control system 602 comprising a data processing capability configured to send and receive messages over the CMISE OAM channel 509.

The element controller comprises a workstation 603, for example a Hewlett Packard 9000 series workstation comprising a processor 604, a data storage device 605, a bus 606 linking the processor and data storage device, a graphical user interface 607, and a communications port 608 for communicating with the network element and the network resource manager. Typically, the element controller operates according to a UNIX operating system 609.

The network resource manager 507 similarly may comprise a work station 610, eg Hewlett Packard 9000 series having processor 611, memory 612, bus 613, graphical user interface 614 and communications ports 615 components, operating in accordance with a UNIX operating system 616. The network resource manager and the element controller are configured to communicate with each other using for example TCP/IP link 508. The network resource manager comprises a managed object base (MOB) 617 containing data describing characteristics and configurations of the network elements under its management. Within the network resource manager, each network element is represented as a managed object, in accordance with the telecommunications network management network (TMN) architecture of ITU-T recommendation M.3010. In managed object base 617 physical resources of the network, comprising the transport entities supporting the trails, eg central office switches, multiplexers, regenerators, cross-connects etc are represented as managed objects in accordance with ITU-T recommendation M.3010 (Principals for a Telecommunications Management Network) in known manner. Additionally, individual capabilities and functionalities of those physical resources, for example trail termination points, connection termination points and adaptations within individual physical or logical ports of the physical resources, and the connection limitations and connectivity capabilities of those physical resources are represented within managed object base 617 according to an object representation scheme as disclosed co-pending patent application entitled "Capability Modeling Using Templates in Network Management System", of the assignees reference ID 0701 as filed on the same day and at the same Government Patent Office as the present application, a copy of which is filed herewith, and the contents of which are incorporated herein by reference.

The network resource manager 507 comprises a trail manager application 620 for managing trails across the network. Management operations controlled by trail manager application 620 are implemented at each of a plurality of element controllers 506 by respective trail management operation controller server 619. In the specific implementation according to the present invention, trail manager application 620 provides a network operator with means for managing trails across a network. In order to enable an operator to manage trails, trail manager application 620 is provided with functionality for:

planning trails across the network;
learning about actual existing trails within the network;
storing data describing existing trails within the network provisioned from planned trails; and
storing data describing whether a planned or provisioned trail is intended within the network.

Within a communications network, although a network operator may create and manage trails using trail management application 620, actual trails may exist within the network which are different to those which the network operator has intended. Trail management application 620 is provided with a graphical user interface (GUI) 614 which enables the network operator to view both the actual trails within the network, and the network operator's planned and/or intended trails within the network. For each trail under management of the trail management application 620, there is maintained data representing a status of the trail. The means for representing the status of each trail comprises a state machine as presented herein. The state machine is part of the trail manager application 620, providing data to the trail manager application. The state machine comprises data processing capability and data storage capability (a database) for maintaining and processing data describing one or more states of each trail under management. In the specific implementation herein, the state machine is physically implemented by configuration of the processing and data storage capabilities of the conventional network management system, for example one or more Hewlett Packard 9000 Series Workstations configured as the element controller, and network resource manager as illustrated in FIG. 6 herein. Such configurations are implemented by arrangement and allocation of a data storage device and by provision of a set of algorithms to perform data processing operations on data stored on the database. Such arrangements and algorithms will be described hereafter in terms of an architecture and structure of a database, and by a series of operations performed on the data, and may be implemented in a conventional programming language, such as the known C language as will be appreciated by those skilled in the art. Specific programming options and variations of implementations are numerous and will be readily apparent to the skilled person.

The trail manager 620 obtains data describing specific trail termination points within individual network elements, from managed object base 617, as described in the aforementioned co-pending patent application, and is thereby provided with information concerning available capacity and connection capabilities for supporting trails and connections. The trail manager application 620 obtains data describing the capabilities, including connectivities and restrictions on connectivities of each of the network elements by referencing a set of data templates stored in the managed object base. The templates include templates describing physical or logical ports of a network element, together with connection templates describing possible connectivities of termination points within each physical or logical port of a network element on a layer by layer basis.

For a better understanding of operation of the state machine, there will now be described a simple example of a problem which may occur concerning management of a trail within a network.

Referring to FIGS. 7 to 10 herein, there is illustrated schematically a representation of an SDH trail traversing three network elements 700, 701, 702. For example, the trail may comprise a VC-12 trail. VC-12 payloads may enter the trail at trail termination source point 703 and is output at trail termination sink point 704. Trail termination is defined as a "transport processing function" that consists of a co-located trail termination source and sink pair. A trail termination sink is defined as a "transport processing function" which accepts the characteristic information of the layer network at its input, removes the information related to "trail" monitoring and presents the remaining information at its output. A trail termination source is defined as a "transport processing function" which accepts adapted "characteristic" information from a client layer network at its input, adds information to allow the "trail" to be monitored and presents the characteristic information of the layer network at its output. The trail termination source can operate without an output from a client layer network. The trail is supported by a plurality of connections 705, 706 between the network elements which enter and leave the network elements at VC-12 connection termination points (VC-12 CTP) 707–710. The VC-12 trail occurs within a VC-12 layer, and the connection termination points occur within that layer. The connection termination points comprise transit points within the trail, between network elements VC-12. Virtual containers traverse the connection termination points without being de-multiplexed. Routing of the VC-12 containers is not dependent upon their content, but is dependent upon the path or route taken by the trail across the network elements. At trail termination sink point, 704, the VC-12 container payloads may be de-multiplexed, eg to a plurality of 2048 Kbit/s streams. Sub-network connections 711, 712, 713 determine connectivity within the network elements from input connection termination points of the network elements to output connection termination points of the network elements.

Figure 8:
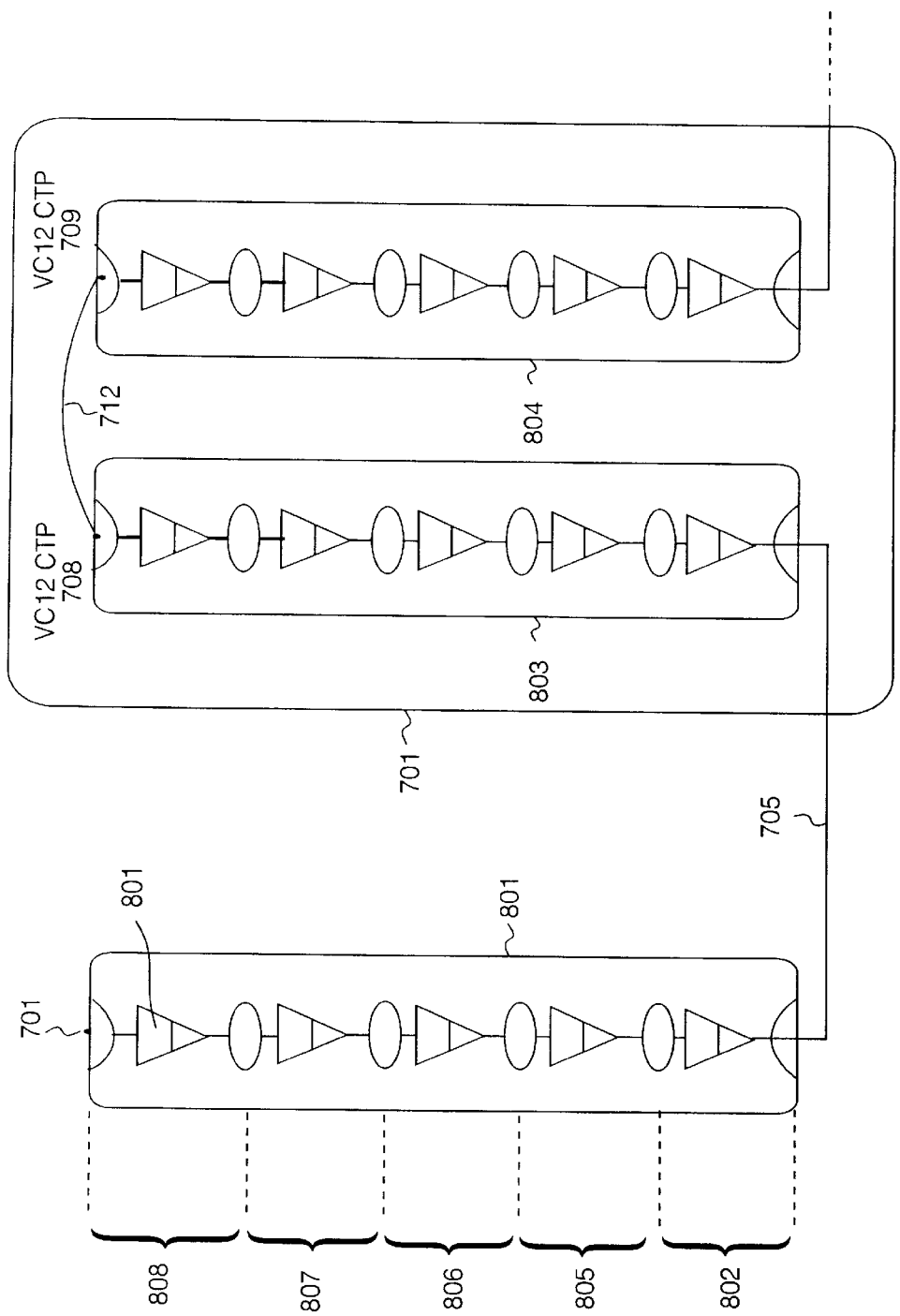
FIG. 8 illustrates schematically a representation of a plurality of ports comprising network elements of FIG. 5 herein.
Figure 9:
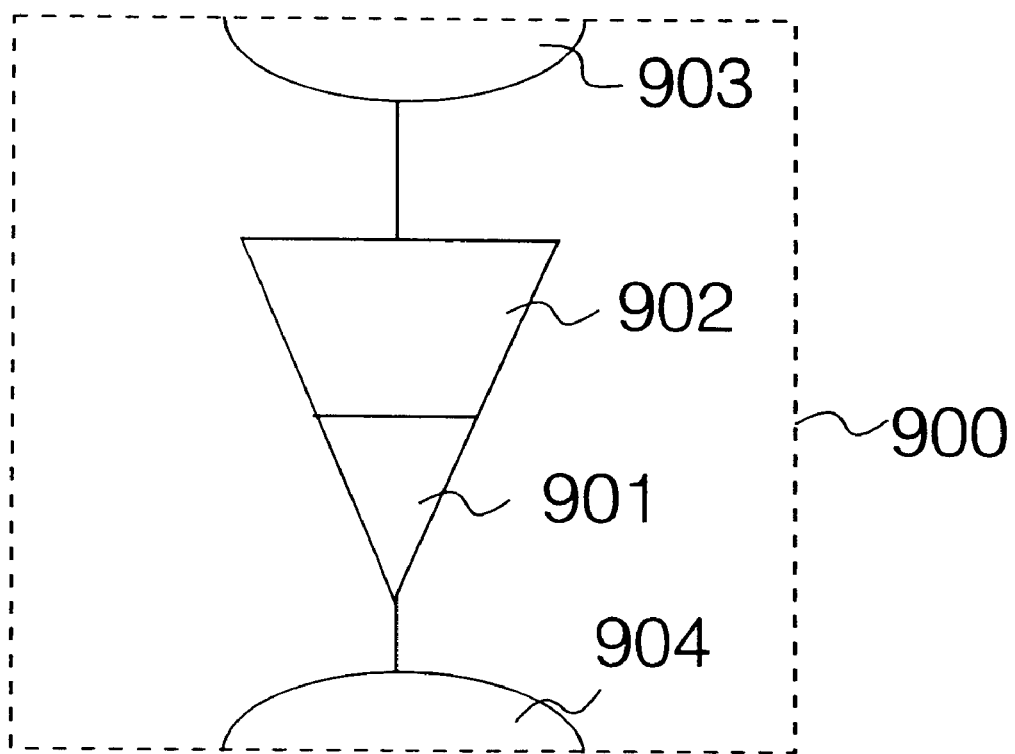
FIG. 9 illustrates schematically a data representation of a trail termination point and adaptation functionality as illustrated in FIG. 8 herein.

In general, each port supporting a trail is represented by a column of layers, similarly as illustrated in FIG. 8 herein. Depending upon the protocol layers supported by the ports, the height of the column may differ from port to port. FIG. 8 illustrates schematically a data representation of part of the VC-12 trail over network elements 700, 701 as stored in the managed object base 617. For each network element, a physical or logical port supporting the trail is represented as an assembly of termination point data templates 900, represented by symbols as illustrated in FIG. 9 herein. Symbol 901 represents a trail termination point, symbol 902 represents an adaptation between a same layer of the trail termination point and a client layer, symbol 903 represents connectivity to a client layer, and symbol 904 represents connectivity to other termination points in the same layer. In FIG. 8, a trail, eg a VC-12 trail, enters first network element 700 at VC-12 termination point 703 through VC-12 adaptation 800 at a first port 801 of first network element 700. Transport between first and second network elements over link 705 is effected over SDH physical media section 802 to an entry port 803 of second network element 701. Conversion of the physical media section through the SDH protocol layer is represented by a set of data templates representing the physical media section layer 802, optical section layer 805, regenerator section layer 806, STM-N layer 807 and HP-VC4 layer 808 each represented by a separate data template as illustrated in FIG. 9. Internal connections between input and output ports 803, 804 within same network element 701 is made via a VC-12 connection 712.

Figure 7:
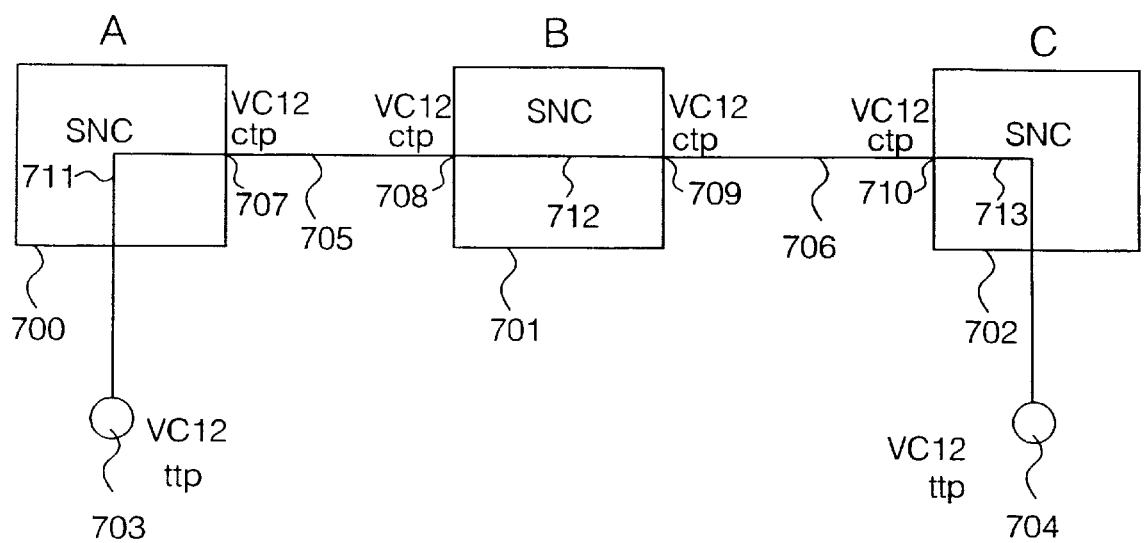
FIG. 7 illustrates schematically a generic representation of a trail across a plurality of transport entities within the communications network of FIG. 5.
Figure 10:
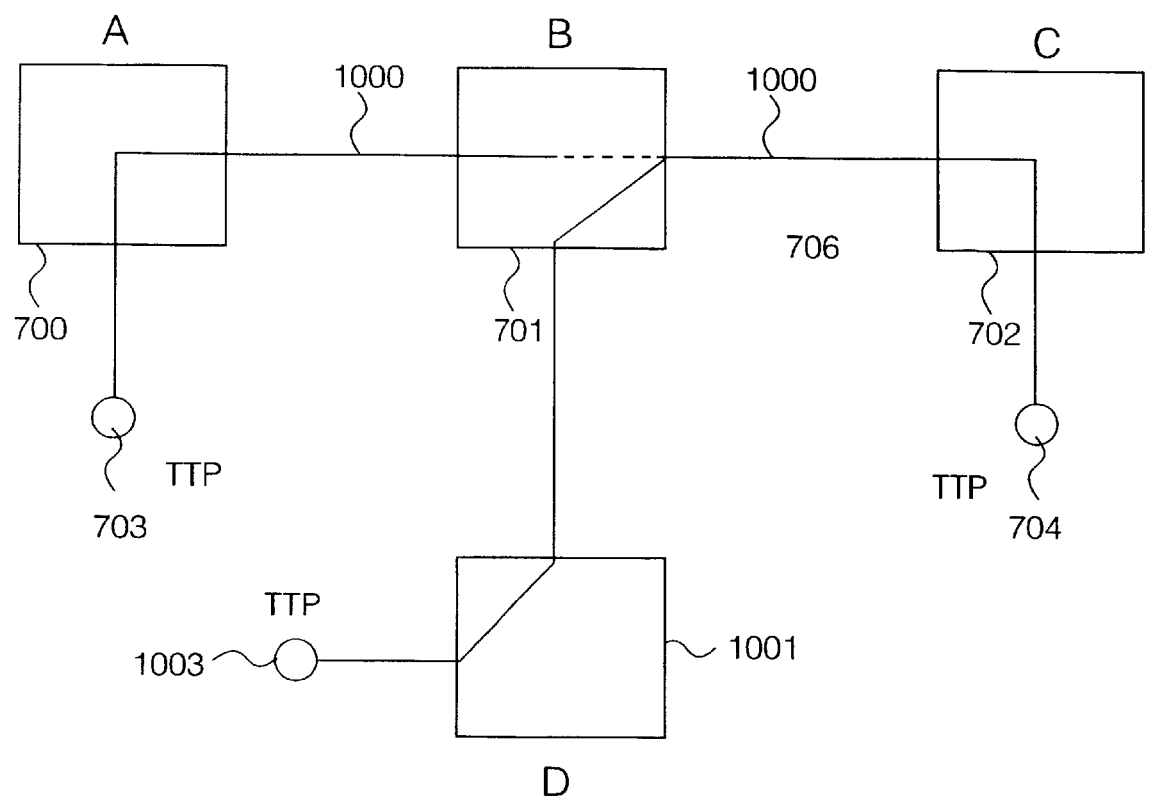
FIG. 10 illustrates schematically a planned trail within a communications network, and an actual trail existing within a communications network.

Referring to FIG. 10 herein, a trail 1000 between trail termination source point 703 and trail termination sink point 704 may be set up by a network operator at network resource manager 506, similarly as described in FIG. 7 herein. The trail manager 620 has a record of the actual trail in the network as described with reference to FIG. 7 herein, from data read from managed object base 617, in accordance with the data template representations described with reference to FIGS. 8 and 9 herein. However, in the network, the actual trail may become altered from that created or intended by the network operator, for various reasons. For example, maintenance personnel may be able to take local control of network elements in order to reconfigure connections directly at the network element level, overriding the network resource manager 506 and element controller 507. Thus, in this example in practice an actual trail may be reconfigured, due to local alterations made at second network element 701 so that the VC-12 trail is re-routed to a fourth network element 1001 as shown in FIG. 10. Thus, a new actual trail 1002 exists in the network between second trail termination source point 1003, through fourth network element 1001, second network element 701, and third network element 702 to end at trail termination sink point 704. Therefore, whilst a network operator at network resource manager 507 intends a first trail between first and third network elements as shown in FIG. 7, due to external circumstances beyond the network operator's control, eg due to local reconfiguration of second network element 701, an actual trail between fourth and third network elements may be created as illustrated in FIG. 10 herein, which is different to the intended first trail, and overwrites it.

In many cases, the actual trails within the network are the same as trails intended by the network operator. However, discrepancies between intended and actual trails do occur. To provide comprehensive trail management throughout the network, the state machine keeps a record of:

planned trails, eg as input by a network operator at GUI 714 of network resource manager 507; and actual trails within the network, eg created at network resource manager 507 and provisioned in the network, or as a result of events occurring within the network independently of network resource manager 507 and element controller 506.

Planned and actual trails may either be intended or unintended. Usually, the intention of a network operator is that all trails planned at the network resource manager 507 become executed as actual provisioned trails in the network. However, trails which were not planned at the network resource manager may or may not be intended.

In the case of the example of FIG. 10, trail manager application 620 records the actual trail 1002 between fourth and third network elements, the intended trail 1000 between first and third network elements, and the fact that the actual trail 1002 between fourth and third network elements may also be intended (since it is a valid trail). Additionally, the state machine may record data representing that each trail identified in FIG. 10 is a valid trail, and that they are in conflict: that is to say both trails cannot exist at the same time in the network, because they are mutually exclusive in terms of their demands on the network elements, as well as recording which of the trails was originally planned, and which of the trails has been learnt from interrogation of the network, and may indicate that the trail manager application 620 cannot resolve the discrepancy between the two trails.

In the specific implementations presented herein, the state machine maintains one or more state models for each trail under management of the trail manager 620. The trails may be either actual trails existing within the network, or trails intended to be created or having been created by the network operator. A state model comprises a data record of a trail which records a state in which the trail currently resides, ie a condition of the trail.

Figure 11:
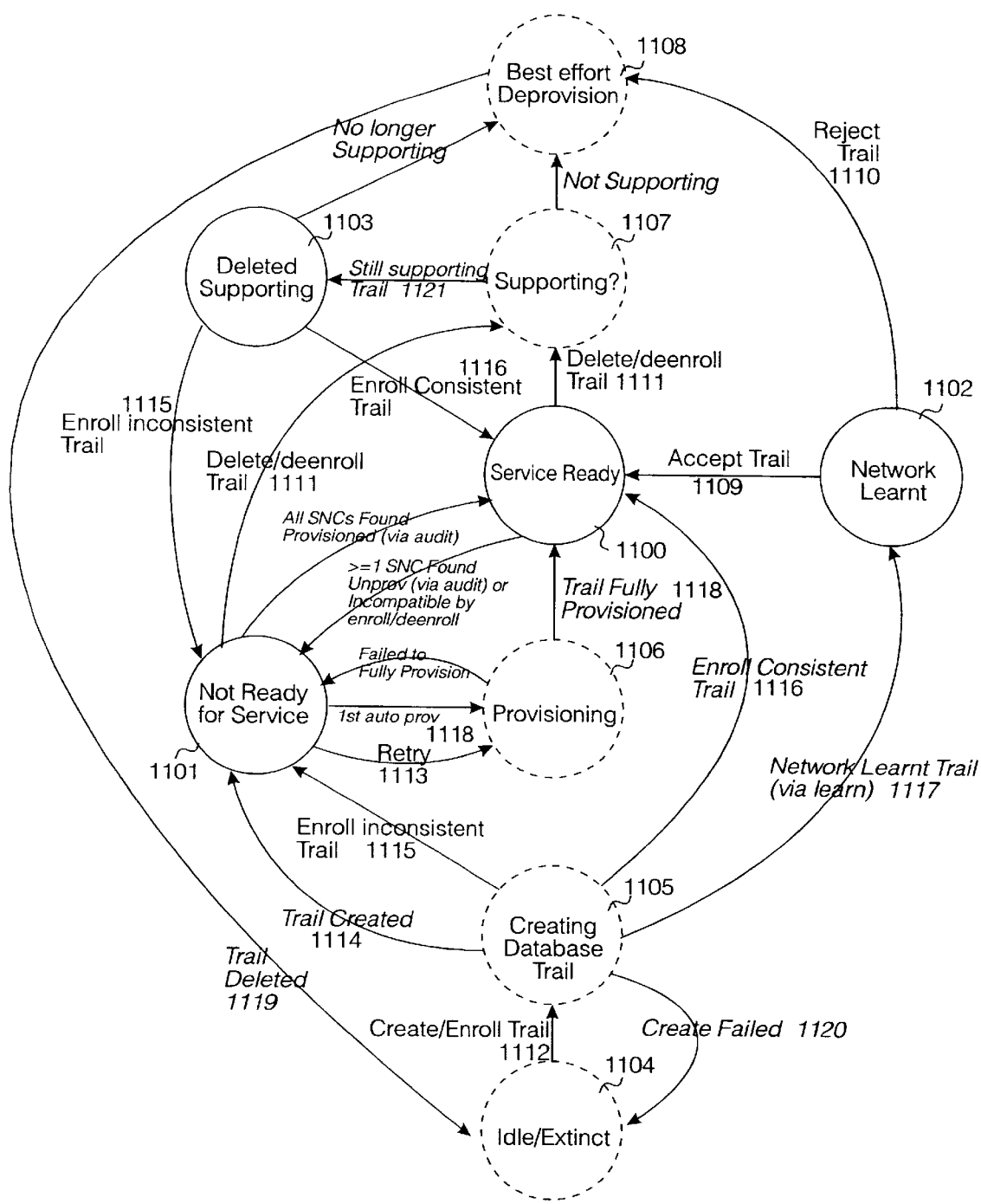
FIG. 11 illustrates schematically a model for a state machine comprising a first specific implementation of the present invention.

According to a first specific implementation of the present invention, there is provided a database containing a list of trails within a network, together with data describing a status and characteristics of the trail according to a state model as illustrated in FIG. 11 herein.

For each trail there is maintained data describing the trail in managed object base 620 in the form of one or a set of trail objects. The state machine performs automatic operations on the trail objects, depending upon which one of a plurality of possible states they reside. Automatic processes carried out by the state machine are shown in italics in FIG. 11. Further, a network operator may activate operations on the trail objects, eg by typing in commands at graphical user interface 614. Network operator initiated operations are shown in bold underlined type in FIG. 11.

Figure 12:
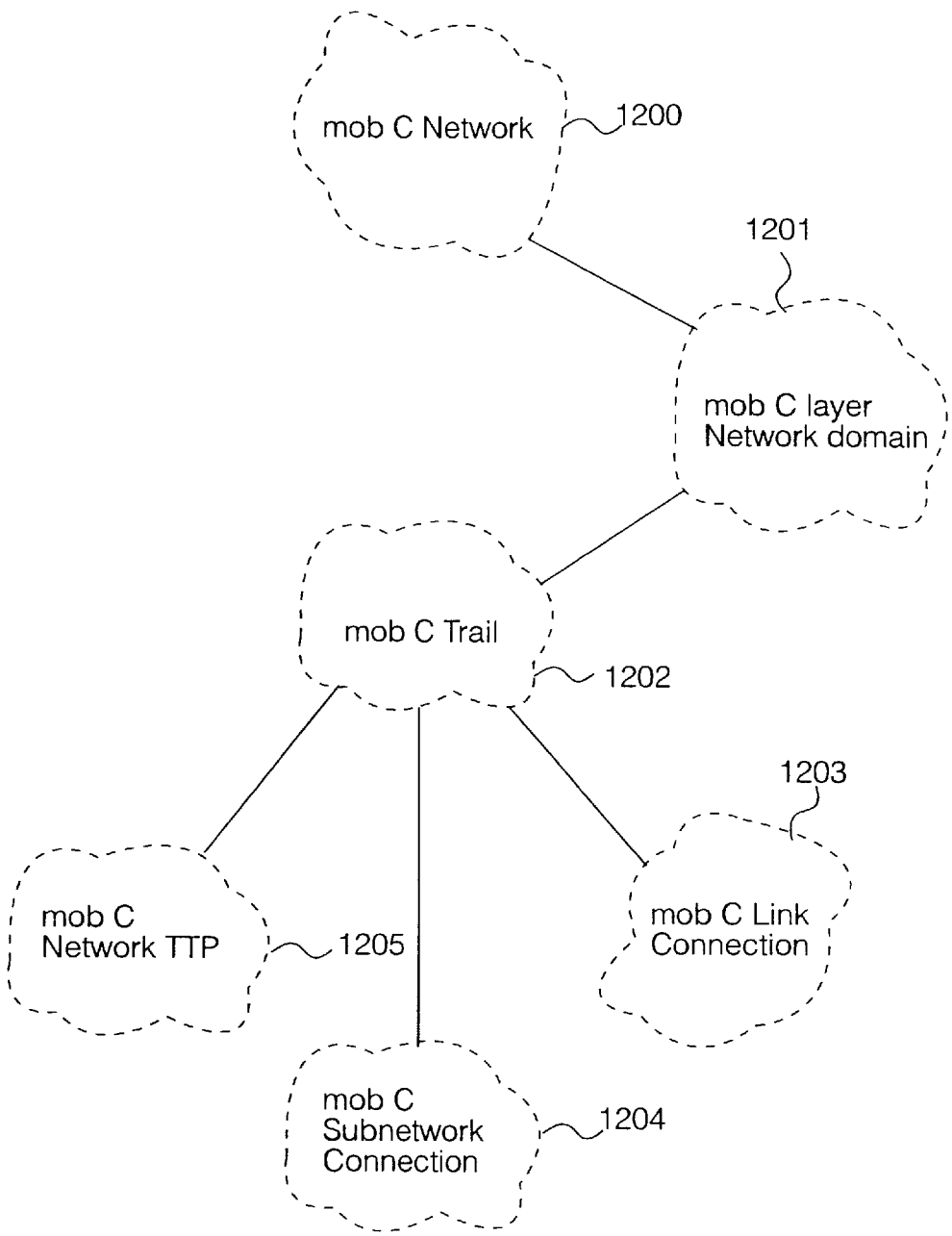
FIG. 12 illustrates schematically a class diagram structure of the state machine illustrated in FIG. 11 herein.

Referring to FIG. 12 herein, there is illustrated a class diagram showing an arrangement of classes of objects in managed object base 617 from which trail management application 620 draws data describing the trails. A network managed object class 1200 contains a plurality of managed objects, eg in accordance with ITU-T recommendation M.3010, describing each network element within the network. A layer network domain class 1201 contains data describing layered protocols, eg SDH, operating within the network. A trail class 1202 contains a plurality of objects each describing a corresponding respective trail in the network. A link connection class 1203 contains data describing link connections between network elements. A sub-network connection class 1204 contains data describing intra-layer connections between ports and/or between network elements. A network trail termination point class 1205 contains data describing individual trail termination points within individual physical or logical ports of network elements.

The state machine draws data from the classes described in FIG. 12, and performs operations on that data, setting the data into a plurality of stable states, transitory states, and sub-states which describe the corresponding condition of the trail, and conditions of individual sub-network connections in the network. In the following description, reference to a state or sub-state of a trail includes reference to a corresponding state or sub-state of data describing the trail in the database.

Within the trail management database, each trail is represented as a trail object. The trail object has several attributes which store data parameters describing the following:

A set of stable states describing a trail.

A set of transient states describing a trail.

A set of sub-states describing a trail, or parts of a trail.

Stable states which may apply to a trail comprise the following:

A service ready state 1100. In this state, a trail object has been successfully created in the trail management database, and the trail has been fully provisioned in the network. The service ready state constitutes a stable working state for the trail.

A not ready for service state 1101. In this state, a trail object has been successfully created in the trail management database, however the trail has not been fully provisioned in the actual network. The not ready for service state constitutes a stable state for the trail object, since data describing the trail may exist within the trail management database indefinitely, without a corresponding actual trail being fully provisioned within the network.

A network learnt state 1102. In this state, an actual trail within the network exists and is provisioned, and has been discovered by the trail management database. However, no operator input has been made into the trail management database indicating a decision for acceptance or rejection of the actual provisioned trail (ie no operator steps 1109 accept trail nor 1110 reject trail have been made). The network learnt state is stable, since an actual trail may exist within a network and data describing its existence may be contained within the trail management database, without full details of the trail being stored in the trail management database. In the network learnt state 1102, an actual trail in the network has been found, but the trail management database has not received instructions from the network operator to accept or reject the trail.

A deleted supporting state 1103. In this state, a provisioned actual trail within the network exists, and a network operator has requested deletion of the trail or entered data describing an intent to delete the trail into the trail management application. However, since the actual trail supports one or more other trails, the trail in the deleted supporting state cannot be removed from the trail management database, because this would involve removing support from other trails, eg client trails. The actual trail within the network remains as long as the trail is in the deleted supporting state. The deleted supporting state constitutes a stable state for a trail, since there can exist an intention to delete a trail indefinitely, whilst the trail cannot actually be deleted because it supports provisioned client trails in the actual network.

A trail normally resides in one of the above stable states, but can make transitions between stable states (shown enclosed by solid lines in FIG. 11). Between stable states, a trail may temporarily reside in any one of a set of transient states (shown enclosed by broken lines in FIG. 11). Data describing transient states are not stored by the trail object, but are temporary states which a trail object may undergo when being changed from being in one state to another. Transient states include the following:

An idle/extinct state 1104. In this state, as far as the trail management database is concerned for a particular trail, no data concerning the existence of that trail exists. Although a trail may actually exist within a network, in the idle/extinct state for that trail, the network management database has not yet received any data indicating the existence of that trail. Under these circumstances, a trail may come into existence by enrollment of a trail from a managed object agent 621 of an element controller 506, or by the network resource manager 507 learning of the actual trail in the network. A trail may also be created by invocation of the operator. The operator may type in details describing the trail at graphical user interface 614 resulting in creation of a trail object.

A creating database trail state 1105. In this state, a trail object is being created in the trail management database by inputting data describing the trail. A trail in the creating database trail state 1104 may result in reversion to the idle/extinct state (ie the trail does not exist); or may result in a service ready state 1100, if the trail object is successfully created in the trail management database and is already provisioned; or can result in the network learnt state 1102, where the trail already exists in the network and the creating database trail transient state constitutes learning of the existence of the trail by the trail management database, or can result in the stable not ready for service state (1101), either by a trail being created in the trail management database, but not being provisioned in the network, or by an existing trail in the network being enrolled and a corresponding trail object existing in the trail management database, but because the enrolled actual trail is inconsistent with the intended trail represented by the trail object in the trail management database, the trail enters the not ready for service state 1101.

A provisioning state 1106. The trail is treated in the state machine as a single entity which may be either provisioned or unprovisioned. In the provisioning state, a trail, data describing which exists in the trail management database, is provisioned by creation of an actual trail within the network. The provisioning state is a transient state which occurs during provisioning. Once the actual trail is provisioned in the network, the trail is no longer in the transient provisioning state. When a trail has successfully passed through the transient provisioning state, the trail object states as attributes, data describing a state of each of a plurality of service components supported by the provisioned trail.

A supporting state 1107. In the transient supporting state, an actual trail in the service ready state 1100, or a trail which was in the not ready for service state 1101 is attempted to be deleted or de-enrolled. In the transient supporting state, checks are carried out to determine whether the trail supports any client trails, before data describing the trail can be deleted from the trail management database. If any client trails are found supported by the trail to be deleted, the trail cannot be de-provisioned or deleted and the trail enters the deleted supporting state 1103. If the trail is determined not to support any client trails, the trail may enter the transient best effort de-provision state 1108.

A best effort de-provision state 1108. In this state, an actual trail in the network is in the process of being deleted. A trail can enter the best effort de-provision state 1108 from the stable deleted supporting state 1103, from the transient supporting state 1107, or from the network learnt state 1102.

Referring again to FIG. 7, an actual trail in the network comprises a plurality of link connections and a plurality of sub-network connections (SNC) between network elements and within network elements. For each sub-network connection comprising an actual network trail, there is stored in managed object base 620 data describing a sub-state of the sub-network connection. Each trail object comprises a data statement which corresponds to a trail state, and also a data statement which corresponds to a trail sub-state. A collection of all the sub-states of each sub-network connection of a trail together define a trail sub-state.

Operational sub-states of a trail include the following. (Each of these sub-states, except the incomplete sub-state, may be assigned to a component sub-network connection of a trail).

An OK sub-state. An OK sub-state describes that a trail or sub-network connection is fully provisioned in the network and is known by the trail management database and is self-consistent.

An incomplete sub-state. An incomplete sub-state describes that a trail is not complete. This state can only occur while a trail is being learnt from the network. A trail from the incomplete state will not be displayed to the network operator.

An in conflict sub-state. In an in conflict sub-state, a trail or sub-network connection is in conflict with other trails in the database in terms of placing demands of physical resources in the network. The component's sub-network connections of in conflict trails reference other trails with which the in conflict state trail conflicts.

An inconsistent sub-state. In an inconsistent sub-state, a trail is not fully supported by the available capabilities of the network elements, or ports of the physical resources supporting it. This may mean that a lower layer trail to which the trail is a client trail may be in an inconsistent sub-state.

An inconsistent trail is in not ready for service state 1101. A trail in a service ready state 1100 which adopts the inconsistent sub-state undergoes a transition to the not ready for service state 1101. In the SDH environment, at the physical media layer, various conditions may occur which may make a trail inconsistent. These include a de-enrol of a card supporting a termination port, or an enrol of a card supporting an incompatible termination point.

An unprovisioned sub-state. A trail or sub-network connection in an unprovisioned sub-state is not fully provisioned in the network.

An unknown sub-state. A trail may be in an unknown sub-state. If all or part of the trail is supported by network elements which are no longer under control of the network resource manager 507 representation of an unknown sub-state is made at the physical media layer by the physical media trails being supported by termination points on the network elements not in the span of control of network resource manager 507. Likewise, all trails supported by that physical media trail also adopt an unknown sub-state. A trail adopting an unknown sub-state does not cause a change in the stable life cycle state of the trail.

Interactions between stable trail states and trail sub-states are illustrated in table 1 herein.

TABLE 1

|  | Trail Sub-States | | | | | |
| --- | --- | --- | --- | --- | --- | --- |
| Stable States | OK | In-complete | In Conflict | Inconsistent | Un-prov'd | Un-known |
| Service Ready | ✓ | X | X | X | X | ✓ |
| Network Learnt | ✓ | ✓ | ✓ | ✓ | X | X |
| Not Ready for Service | ✓ | X | ✓ | ✓ | ✓ | ✓ |
| Deleted Supporting | ✓ | X | ✓ | ✓ | ✓ | ✓ |

A ✓ in the column indicates that the trail sub-state is valid for the specified stable state.

The operational sub-states shown in table 1 apply to an entire trail. Each trail comprises one or a plurality of connections, each of which may adopt a sub-state. For any trail sub-state, all sub-network connections of the trail must be in a connection sub-state which is consistent with the trail sub-state. Table 2 herein illustrates interactions between sub-states of a plurality of sub-network connections in a trail, and a sub-state of the trail itself.

TABLE 2

|  | Sub-State Interactions | | | | | |
| --- | --- | --- | --- | --- | --- | --- |
|  | Sub-network connection sub-states | | | | | |
| Trail Sub-States | Okay | In-complete | In Conflict | Inconsistent | Un-prov'd | Un-known |
| Okay | ✓ | X | X | X | X | X |
| Incomplete | X | ✓ | ✓ | ✓ | X | ✓ |
| In conflict | X | ✓ | ✓ | ✓ | ✓ | ✓ |
| Inconsistent | X | ✓ | ✓ | ✓ | ✓ | ✓ |
| Unprov'd | X | X | ✓ | ✓ | ✓ | ✓ |
| Unknown | X | ✓ | ✓ | ✓ | ✓ | ✓ |

In the example of FIG. 7, at some stage, a network operator intended the trail between trail termination points 703, 704 to be created, and the trail was successfully provisioned in the network. Referring to table 1 herein, an overall state of the trail may be service ready, and sub-states of each sub-network connection may be Okay, correspondg to an overall sub-state for the trail as Okay. Referring to FIG. 10 herein, network element 701 may be reconfigured, for example due to a manual operation at the network element, so that the original trail 1000 in the network becomes non-operational, eg by disconnection of a sub-network connection, resulting in the original trail 1000 becoming de-provisioned. The trail management database receives data from the network, through OAM channel 509 to element controller 506, and through communications link 508 to network resource manager 507, and alters the data describing the sub-state of the sub-network connection at network element 701 as being unprovisioned. This results in an overall sub-state for the whole trail being set to unprovisioned. This results in a transition of an overall life cycle state of the trail changing from the service ready state 1100 to the not ready for service state 1101.

Transitions between states and sub-states may occur either automatically, or as a result of actions by the network operator, eg typed in at graphical user interface 614 or 607. Examples of operator actions which may cause transitions between stable states include acceptance or rejection of a network learnt trail 1109, 1110, deletion of a trail 1111, creation/enrollment of a trail 1112 and a re-attempt at provisioning a trail 1113 from a not ready for service state.

In addition to operator initiated transitions between stable states, the state machine operates a set of automatic processes which cause transitions between stable states. Automatic processes include a trail created process 1114; an enrol inconsistent trail process 1115; an enrol consistent trail process 1116; a network learnt trail process 1117; an auto-provision process 1118; and a trail delete process 1119. Transitions between stable states may occur as a result of either network operator initiated, automatic or a combination of network operator, initiated and automatic processes.

Figure 13:
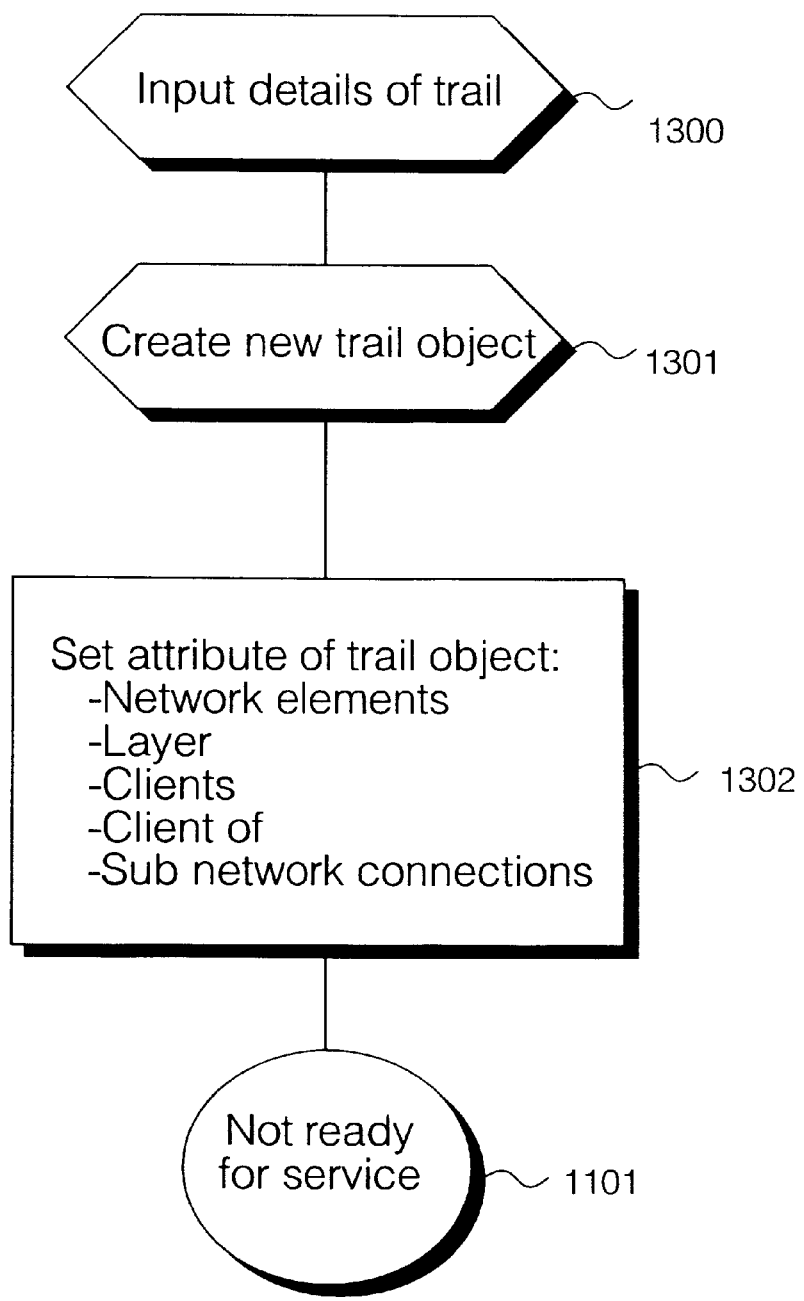
FIG. 13 illustrates schematically an automatic trail creation process implemented by the state machine.

Referring to FIG. 13 herein, a trail created process 1114 initiated by a network operator is effected by the network operator inputting details of a trail to be created (step 1300) at graphical user interface 614 of network resource manager 507. The network operator may be provided with a graphical display showing a map of network elements represented as a set of link icons between a set of network element icons. The network operator may build a trail visually by manipulation of a cursor display and by selection of a command menu to build a trail. A trail object is created (step 1301) in which data describing the trail, including its sub-network connections, the physical entities (network elements) through which it passes, its layer, its client layers, or layers of which it is a client, is assembled according to the class diagram as illustrated in FIG. 12 herein. Details describing the trail to be created are stored as attributes of the trail object (step 1302). At this stage, although a trail object is created, the trail object is in the not ready for service state 1101, since the trail is not yet provisioned.

Figure 14:
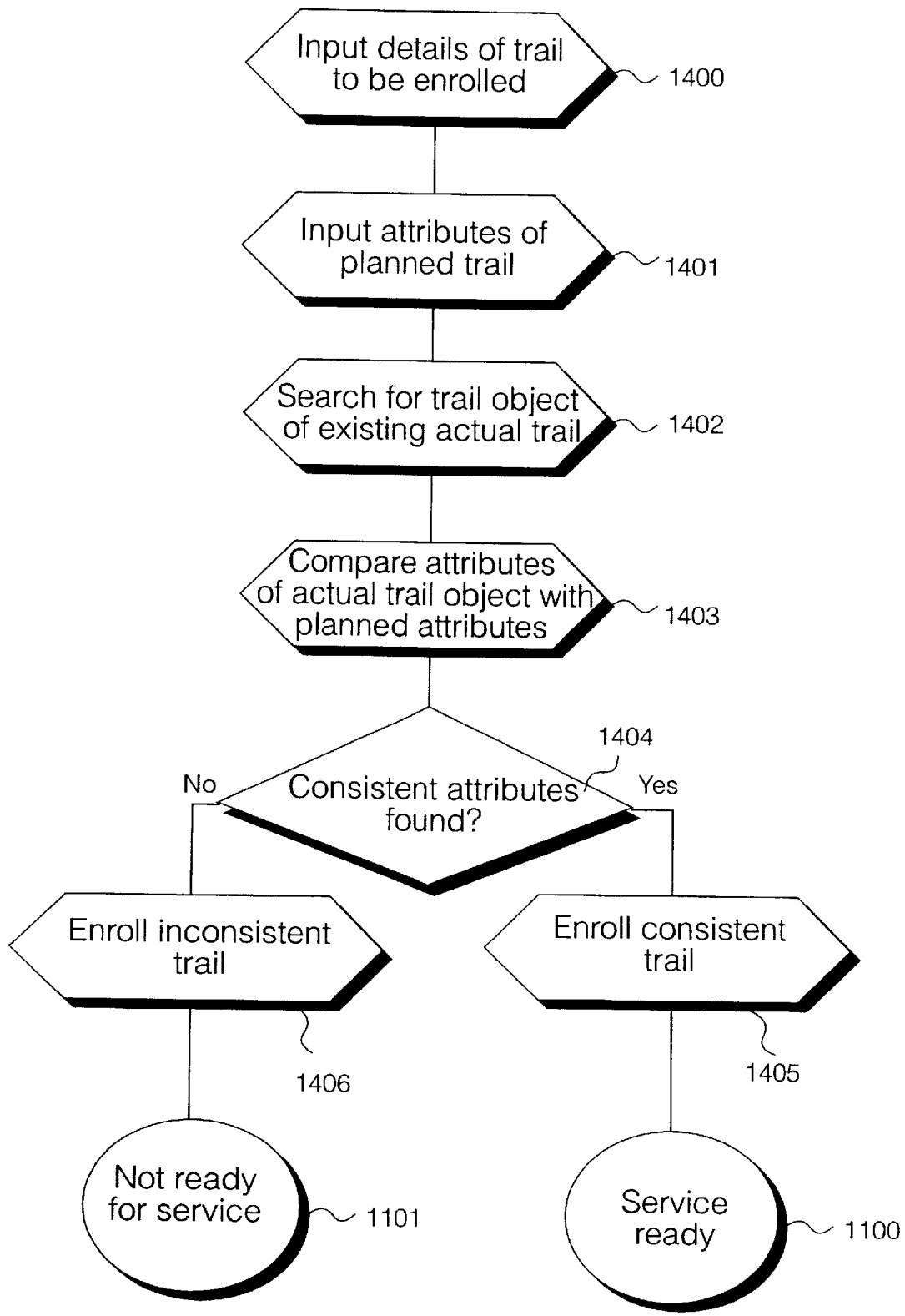
FIG. 14 shows schematically part of a trail enrollment process operated by the state machine.

Referring to FIG. 14 herein, a trail may be enrolled for use either in the service ready state 1100 or in the not ready for service state 1101. In response to an operator input for enrolling a trail, the operator inputs details of a planned trail to be enrolled, at the graphical user interface (step 1400). The operator inputs attributes of the planned trail, eg via a keyboard or pointing device (step 1401). The state machine carries out a search of existing trail objects representing existing actual trails (step 1402). The input attributes of the planned trail are compared with the attributes of object representing actual network trails in step 1403. If a trail object is found having consistent attributes with the planned attributes input by the operator (1404), the trail object of the found existing trail is enrolled (step 1405) and the trail object is set to a service ready state (1100). However, if a trail object having fully consistent attributes with the planned attributes is not found, the state machine may select a trail object having similar or close attributes, but which are inconsistent with the attributes planned at step 1406. The trail object is set at the not ready for service state 1101.

If for any reason a trail object cannot be created, for example if a network operator inputs a set of attributes which are inconsistent with each other, the state machine returns to the idle/extinct state (1104) in a create failed process 1120.

Figure 15:
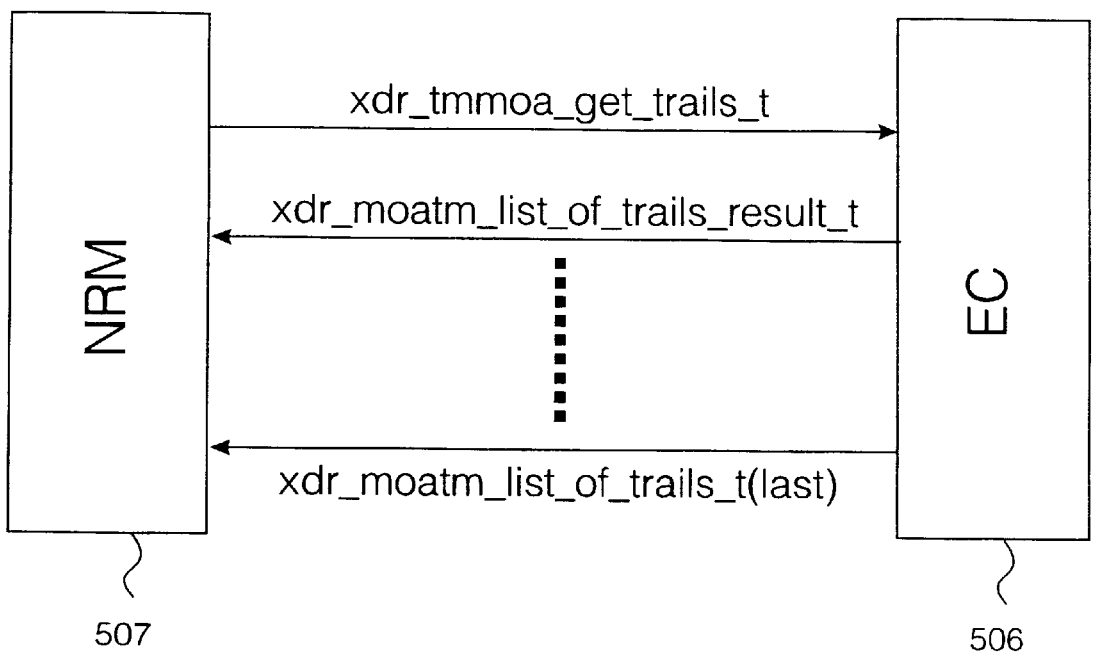
FIG. 15 illustrates messaging between the element controller and network resource manager for obtaining lists of trails supported by network elements under management of a network controller.

Periodically within the state machine, an audit process occurs in which trails are audited such that all sub-network connections in the trails are checked. If all sub-network connections of a not ready for service state trail are found to be provisioned during an audit process, the trail transitions from the not ready for service state 1101 to the service ready state 1100. Similarly, during the audit, if any sub-network connections are found of a trail in a service ready state, then this means a trail recorded by the state machine as being in a service ready state 1100, corresponds to an actual trail which is in a not ready for service state 1101. The trail object converts from the service ready state to the not ready for service state upon learning of an unprovisioned sub-network connection in a trail. Similarly, a transition from the service read to the not ready for service state may occur if a sub-network connection is found to be incompatible with the service ready trail by an enrol/de-enrol process. During the periodic audit process network resource manager 507 interrogates element controller 506 using an XDR message set for obtaining a list of actual trails in the network. An example of XDR messages for obtaining lists of trails is illustrated in FIG. 15 herein.

Figure 16:
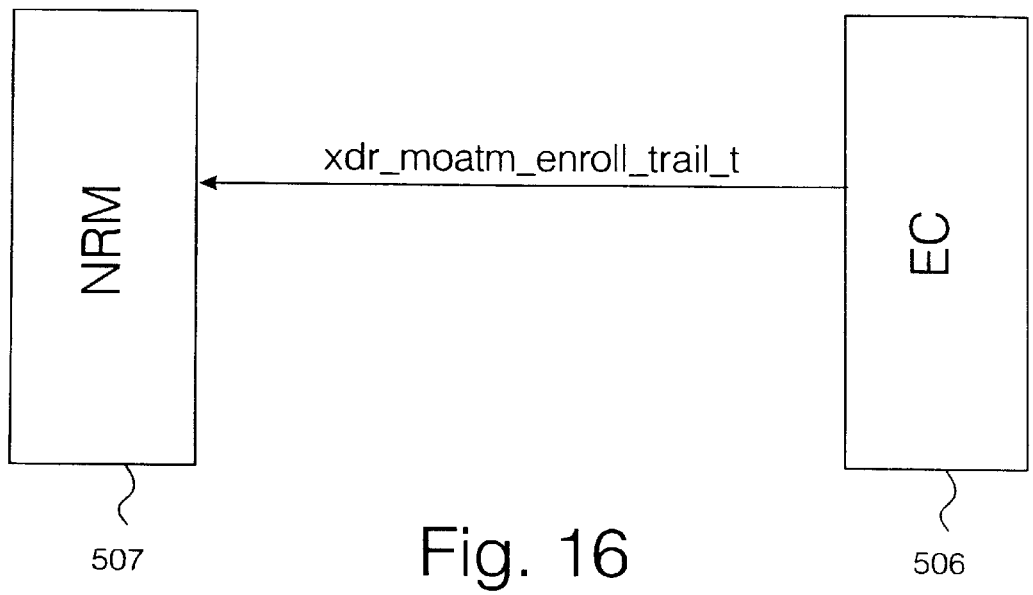
FIG. 16 illustrates schematically automatically generated enrollment and de-enrollment messages transmitted between an element controller and network resource manager of the network management system.
Figure 18:
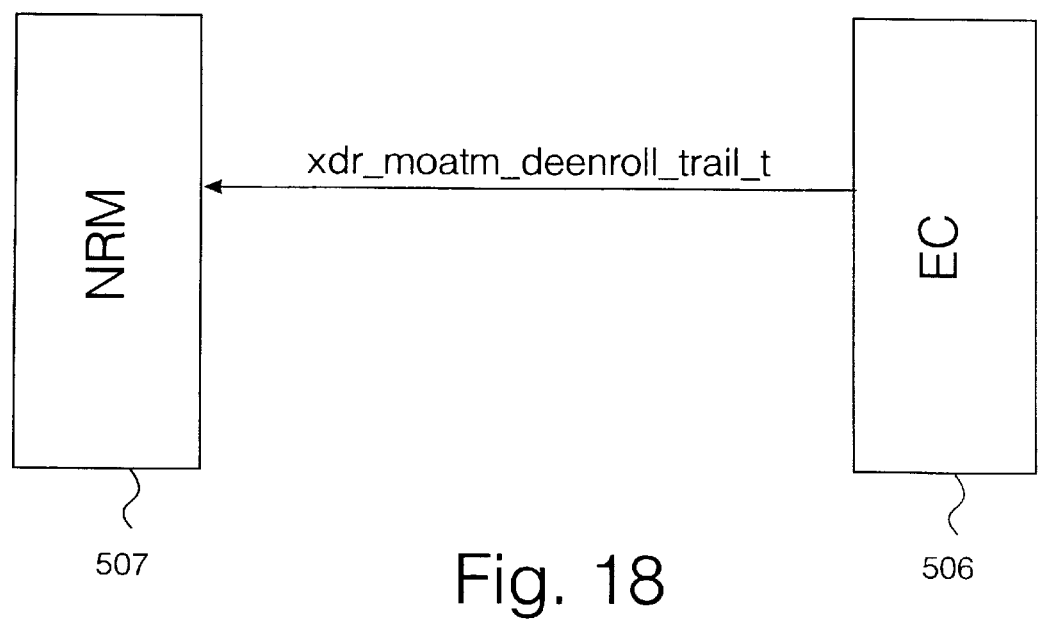
FIG. 18 illustrates schematically an automatic process for transitioning between a service ready state and a deleted supporting state implemented by the state machine.

A network learnt trail process 1117 by which a trail object reaches the network learnt state 1102 may occur by way of automatic enrollment of trails from the network elements at the element controller 506 followed by a trail notification process from element controller 506 to network resource manger 507. Trail notification messages may be received from network elements which have been locally configured, eg by maintenance personnel, to create new trails. Messages may be received over the OAM channel, generated automatically by the network elements and received at element controller 506. The element controller automatically passes the trail enrollment message to the network resource manager 507, eg using the known UNIX external data representation (XDR) messaging set as illustrated in FIG. 16 herein.

Figure 17:
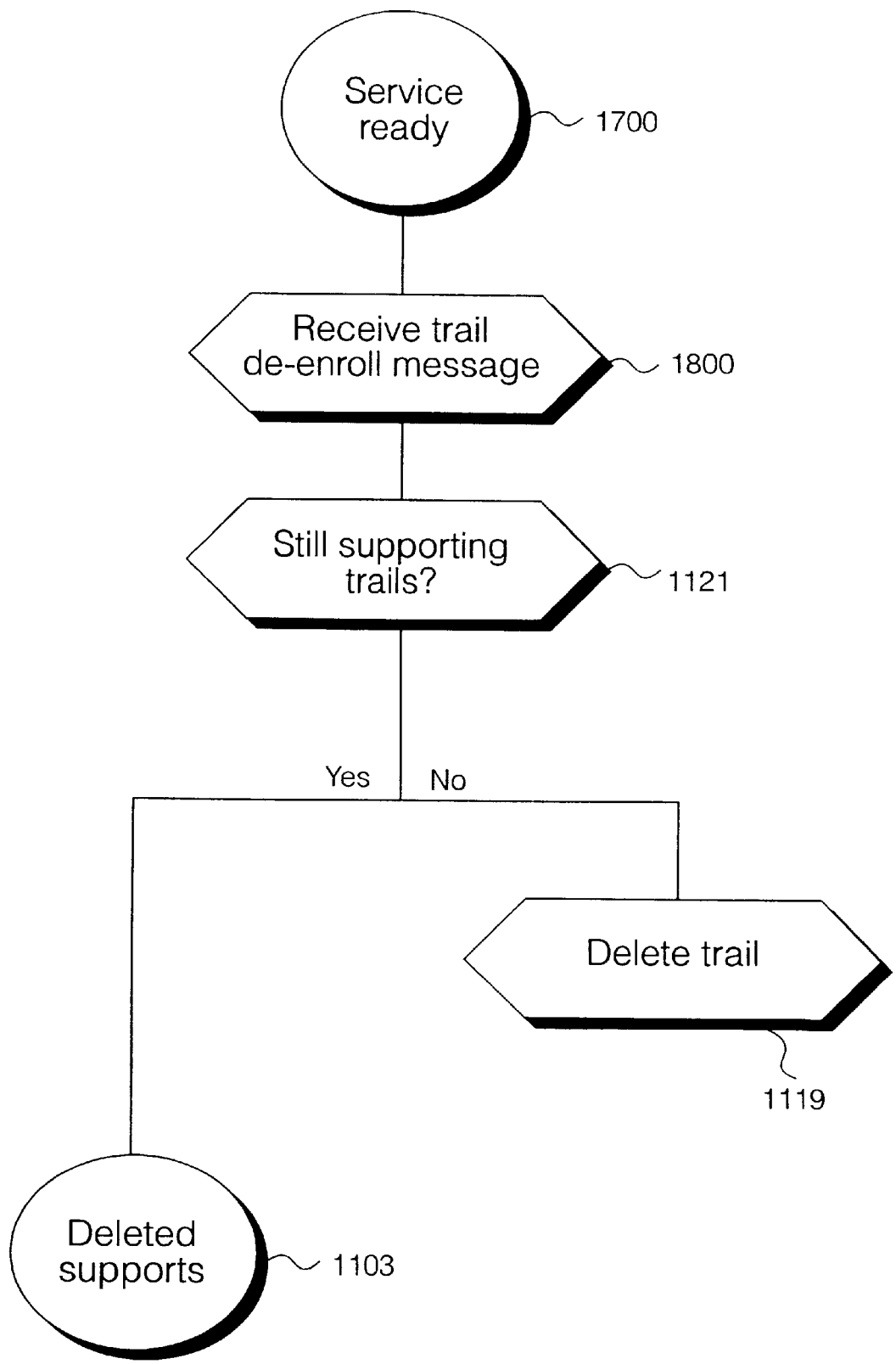
FIG. 17 illustrates schematically a flow diagram illustrating how the apparatus of FIG. 16 is used.
Figure 19:
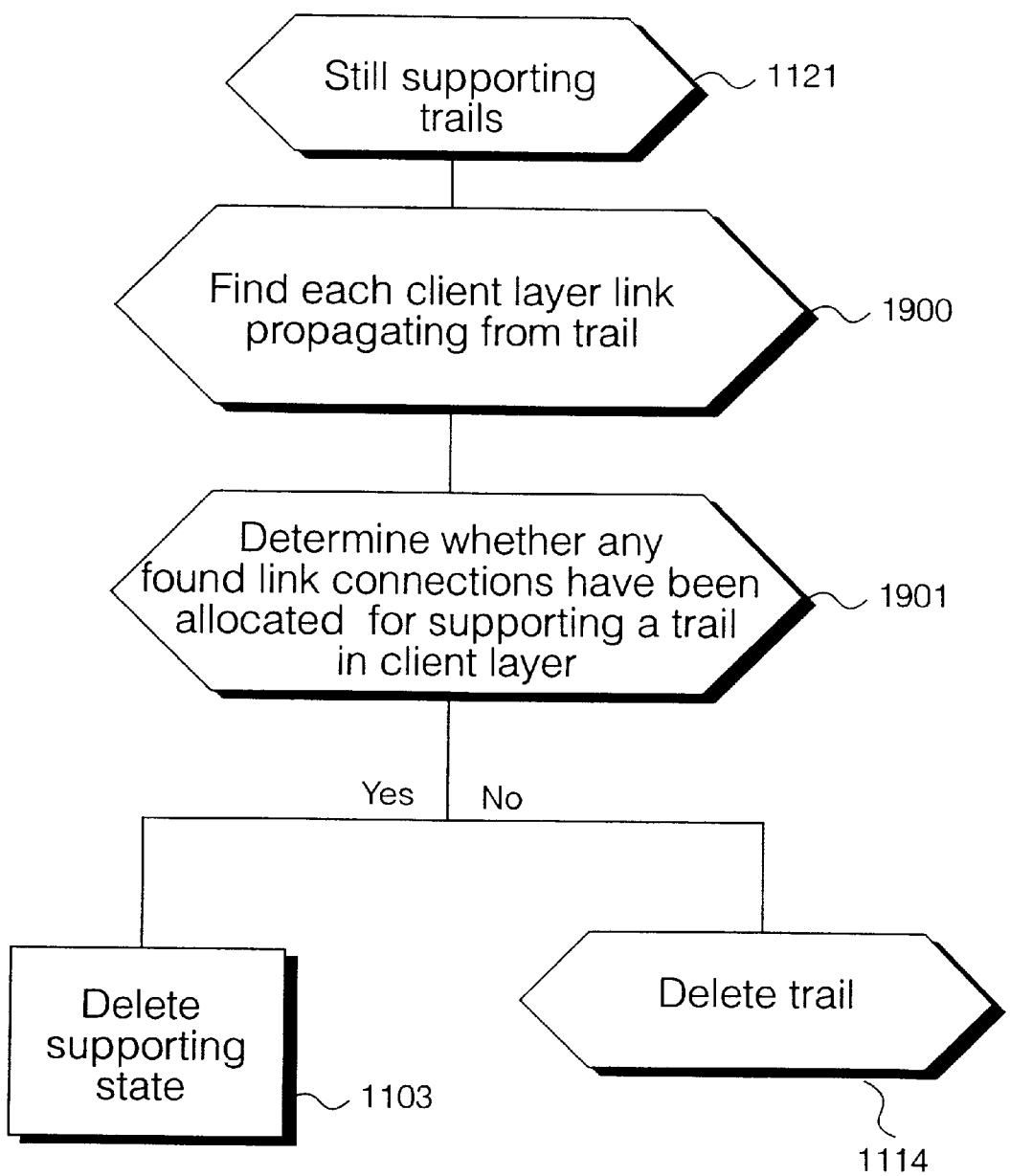
FIG. 19 illustrates schematically steps of a process for determining whether a trail supports any client trails implemented by the state machine.

A trail object in a service ready state 1100 may be de-enrolled by the state machine upon receipt of a de-enrol message received from the network as illustrated in FIG. 17 herein. Network elements which are locally reconfigured to remove trails automatically generate de-enrollment messages which are sent out over the OAM channel in the network and received by the corresponding respective element controller 506. Element controller 506 sends an XDR de-enrollment message, eg of the form shown in FIG. 17 herein, to network resource manager 507. Upon receiving the de-enrollment message, it is checked whether the trail is still supporting any other trails, eg client trails in step 1801. If the de-enrolled trail is still supporting other trails, the trail object enters the deleted supporting state 1103 via an automatic trail support check process still supporting trails 1121 which checks whether the trail still supports other client trails. However, if the trail does not support any client trails, the trail undergoes automatic trail delete process 1119. The automatic still supporting trails checking process 1121 is illustrated further in FIG. 19 herein. In step 1900, each client layer link propagating from the trail is found. This may occur through interrogation of other trail objects within the database, and/or by obtaining a list of trails from the network via element controller 506. Where a list of trails is obtained from the network, the network resource manager interrogates the element controller by a set of XDR messages as illustrated with reference to FIG. 15 herein, which results in element controller 506 returning a list of trails supported by network elements which it manages. In step 1901, it is determined whether any link connections found have been allocated for supporting a trail in a client layer. If link connections supporting trails in a client layer have been found, the trail object enters the deleted supporting state 1103, since the trail cannot be deleted, since it still supports client trails. However, if the trail is not found to support any client trails, the trail object undergoes automatic trail delete process 1119.

Figure 20:
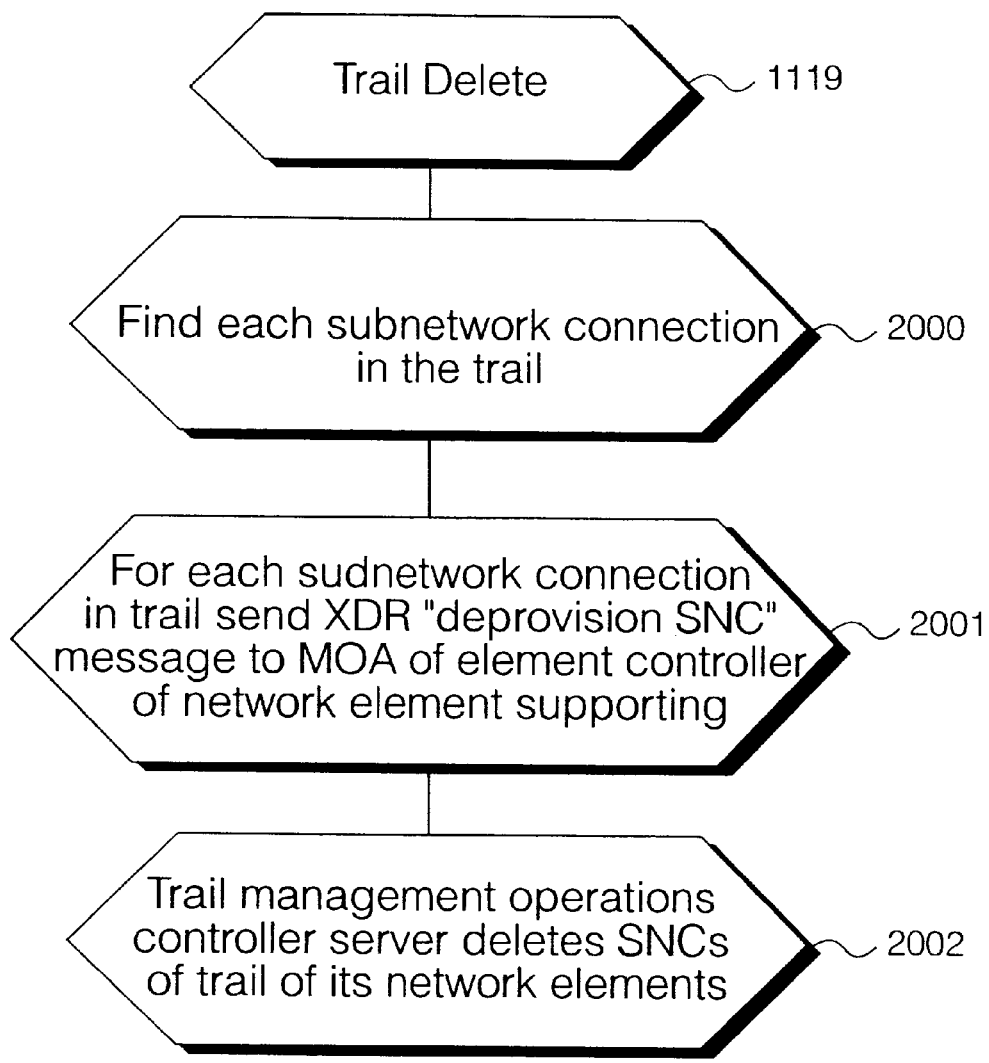
FIG. 20 illustrates steps of a trail deletion process for implementing a best effort at de-provisioning a trail in the network.

Trail delete process 1119 comprises steps as illustrated in FIG. 20 herein. Firstly, each sub-network connection in the trail is found in step 2000. For each sub-network connection in the trail an XDR "deprovision sub-network connection" message is sent to the managed object agent 621 of the element controller corresponding to the network element supporting the sub-network connection (step 2001). The trail management operations controller server 619 deletes the sub-network connections of network elements connected to the element controller 506 corresponding to the trail being deleted. The automatic trail deletion process 1114 corresponds to a best effort deprovision transitory state 1108. In some cases, it may not be possible to remove all sub-network connections in a trail. However, a "best effort" is made to deprovision all sub-network connections supporting a trail in the delete trail process 1119.

Figure 21:
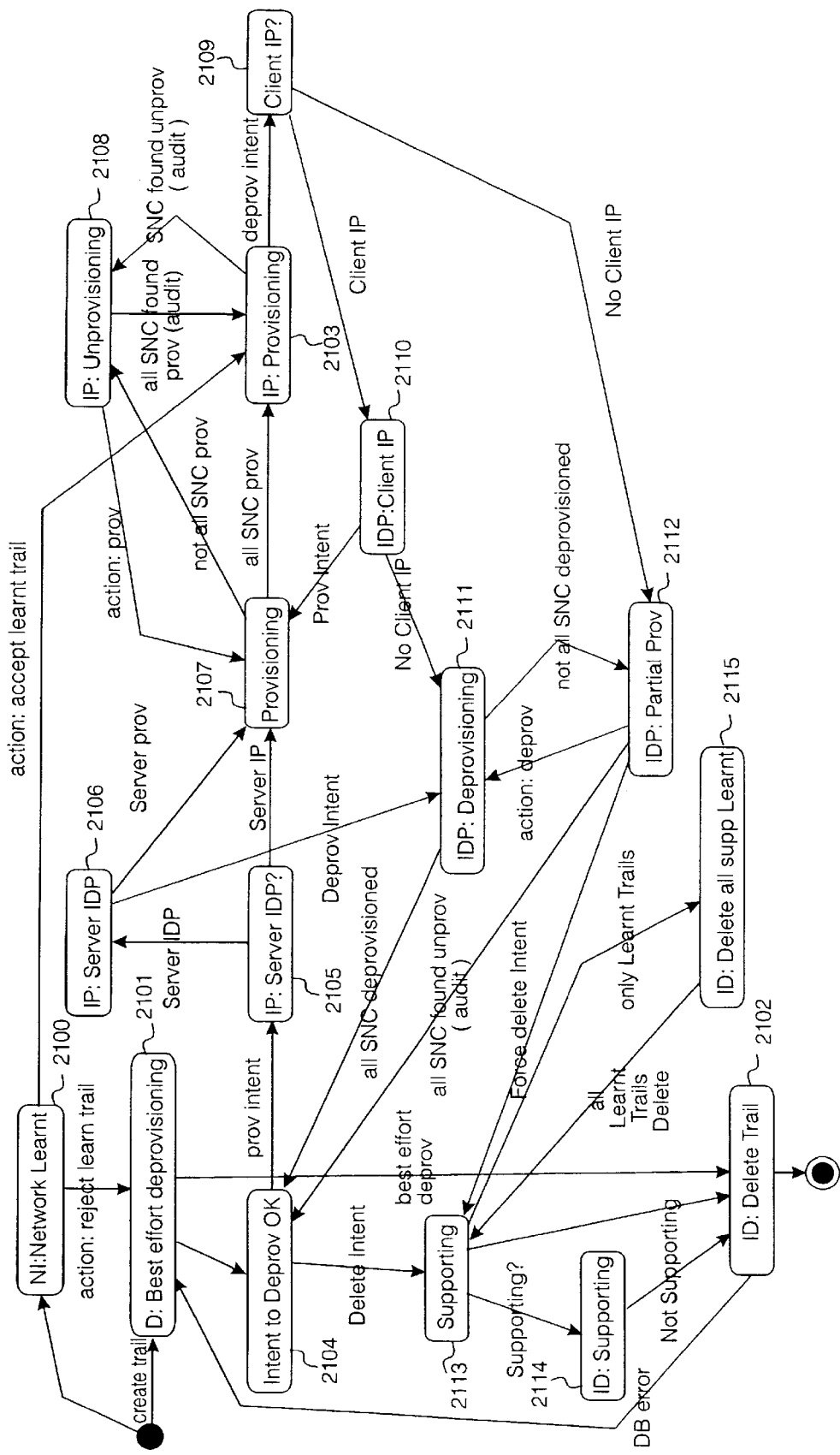
FIG. 21 illustrates schematically a state model according to a second implementation of the present invention in which a network management system incorporates data describing an intended trail configuration in a communications network.

Referring to FIG. 21 herein, there is illustrated schematically an information model for a second state machine according to a second specific implementation of the present invention. The second state machine comprises a database and data processing functionality supported by conventional computing means, eg HP9000 workstation configured as a network controller (eg network resource manager 507) interfacing with one or a plurality of element controllers 506, eg using the known UNIX XDR messaging protocol as described herein before. In the second implementation herein, each trail under management, whether planned at the network resource manager, and not yet provisioned, or only partially provisioned, or an actual trail existing in the network, is represented by its own corresponding respective trail object. A state of the trail is represented by a set of attributes of the trail object according to the state model illustrated in FIG. 21.

The second state model herein as illustrated in FIG. 21 aims to provide data describing trails which allows for a network operator's intention either to provision a trail, or to de-provision a trail, whilst taking into account the trails which actually exist in the network, and taking into account any changes in actual network trails made as a result of local reconfiguration of network elements independently of the network operator.

In recognising an intent to de-provision a trail, the second state model herein takes account of future intended client trails to be provisioned. In some cases, a trail which is intended by a network operator to be de-provisioned, may remain provisioned, due to a planned client trail which is intended to be provisioned, and which relies on the trail which was intended to be de-provisioned. Operator intentions are modelled as a set of stable states of the trail object. Some of those stable states correspond only to a network operator's intention, which the network operator enters into the network resource manager as a set of commands and instructions, eg by keyboard or manipulation of a pointing device over a menu on a graphical user interface. Such planned trails or planned deletions of trails may not yet be implemented in the actual network. Other stable states describe actual trails within a network.

Whereas, in the first specific implementation of FIG. 11 herein, a trail may reside indefinitely in the not ready for service state 1101 for a number of reasons, for example because a particular trail was intended to be provisioned but for some reason it could not be provisioned, or because the trail had already been provisioned, but there was an error in provisioning the trail, in the second specific implementation herein (FIG. 21) in general, in each state there are fewer routes for a trail to arrive at any particular state.

The plurality of states comprise:

a network learnt state 2100, in which an actual trail within the network has been recorded as existing, but which has yet to be accepted or rejected by a network operator or automatic action.

a intend to delete: best effort de-provisioning state 2101, in which the network controller has received input data representing that it is intended to de-provision a trail which was learnt by the network and which has been rejected.

an intention to delete: delete trail state 2102, in which a received data input indicates a trail is intended to be deleted, either because there is an intention to best effort de-provision the trail, or because there is an intention to de-provision the trail and the trail is not supporting any other trails.

an intention to provision state 2103, in which it is intended to provision a trail.

an intent to de-provision Okay state 2104, in which a trail object may reside after a trail object has been created and the trail object is awaiting an input determining whether the intention is to provision or provision the trail.

an intent provision: server intent de-provision? state 2105, in which state a trail object may await receiving an input from a server on whether the server has a trail recorded as for de-provisioning or provisioning.

an intent provision: server IDP state 2106, in which a trail which is intended to be provisioned has received an input from a server which records the trail as intended to de-provision.

a provisioning state 2107, from which the trail may either by provisioned or unprovisioned depending on whether all sub-network connections of the trail are able to be provisioned.

an IP: unprovisioned state 2108, in which an attempt at provisioning a trail has failed because not all the sub-network connections can be provisioned.

a client IP? state 2109, in which a trail has been recorded as being intended to be de-provisioned and it is being checked whether any client trails are intended to be provisioned which would rely on the trail to be de-provisioned.

an IDP: client IP state 2110, in which a trail which was intended to be de-provisioned has been recorded as having client trails relying upon it, which are intended to be provisioned.

an IDP: deprovisioning state 2111, in which a trail is recorded as being intended to be de-provisioned, and either no server relies on the trail, or no client trail relies on the trail to be de-provisioned.

an IDP: partial prov state 2112, in which not all sub-network connections of an intended to be de-provisioned trail have been de-provisioned.

a supporting state 2113, in which there is an intention to delete a trail, but the trail is still supporting the other trails (transient state).

an ID: supporting state 2214, in which there is an intention to delete a trail, but the trail has actually been found to be supporting other trails.

an ID: delete all supp learnt state 2215, in which it is intended to delete only learnt trails.

What is claimed is:

1. A method of managing a plurality of communications trails each comprising a transport entity for the simultaneous transfer of information in opposite directions between respective inputs and outputs, said method comprising:
   maintaining a database describing said plurality of trails in which each said trail is represented by a corresponding respective trail data describing at least one of a plurality of states applicable to said trail; and
   checking consistency for ensuring consistency of trails with the trail data stored in said database
   wherein the trail data is capable of modification so as to transition between the states,
   wherein said state applicable to a trail is selected from a set consisting of:
      a state representing a condition in which said trail is provisioned in a network;
      a state representing a condition in which said trail is un-provisioned in a network;
      a state representing a condition in which said trail is supporting at least one client trail; and
      a state representing a condition in which said trail is present in a network, but which has not been accepted or rejected by a network management system.

2. The method as claimed in claim 1, comprising the step of:
   for individual ones of said trails, applying a transition to said corresponding respective trail data from describing one of said plurality of states, to describing another of said plurality of states.

3. The method as claimed in claim 1, comprising the step of applying a transition to said trail data from describing one of said plurality of states to describing another of said plurality of states, wherein said transition between states is made in response to instructions input from a graphical user interface.

4. The method as claimed in claim 1, comprising the step of applying a transition to said trail data from describing one of said plurality of states to describing another of said plurality of states, wherein said transition is made in response to data received from at least one transport entity.

5. The method as claimed in claim 1, wherein said trail data comprises data describing a stable state, in which stable state said trail data may reside for an indefinite period of time.

6. The method as claimed in claim 1, comprising implementing said database as a plurality of trail objects, each said trail object representing a corresponding trail, and representing said trail as an attribute of said trail object.

7. The method as claimed in claim 1, wherein for each said trail, said corresponding trail data represents a condition of a plurality of connections of said trail.

8. The method as claimed in claim 1, wherein said trail data representing a corresponding respective said trail describes:
   a sub-state of each of a plurality of connections comprising said trail; and
   a sub-state of said trail.

9. A method of managing a plurality of communications trails each comprising a transport entity for the simultaneous transfer of information in opposite directions between respective inputs and outputs, said method comprising:
   maintaining a database describing said plurality of trails in which each said trail is represented by a corresponding respective trail data describing at least one of a plurality of states applicable to said trail; and
   consistency check means for ensuring consistency of trails with the trail data stored in said database
   wherein the trail data is capable of modification so as to transition between the states,
   wherein said trail data describes at least one trail sub-state applicable to said trail,
   wherein said applicable trail sub-state is selected from a set consisting of:
      a substate describing that no other sub-states exist;
      a sub-state describing an incomplete trail;
      a sub-state describing a trail which conflicts with another trail;
      a sub-state describing a trail which the underlying physical resources are not consistent with each other;
      a sub-state describing a trail which is not fully provisioned in a network; and
      a sub-state describing a trail, details of which are present in the database, where the network physical resources supporting that trail are not communicable with said database.

10. The method as claimed in claim 9, wherein said trail data describes at least one trail sub-state describing a provisioned trail.

11. A method of managing a plurality of communications trails each comprising a transport entity forte simultaneous transfer of information in opposite directions between respective inputs and outputs, said method comprising:
    maintaining a database describing said plurality of trails in which each said trail is represented by a corresponding respective trail data describing at least one of a plurality of states applicable to said trail;
    consistency check means for ensuring consistency of trails with the trail data stored n said database
    wherein the trail data is capable of modification so as to transition between the states,
    wherein said trail data describes at least one connection sub-state applicable to a connection comprising said trail, wherein said connection sub-state is selected from a set consisting of:
       a sub-state describing a provisioned connection;
       a sub-state describing an incomplete connection;
       a sub-state describing a connection which conflicts with another connection;
       a sub-state describing a connection which lacks support of physical resources;
       a sub-state describing a connection which is not provisioned in a network; and
       a sub-state describing a connection supported by network physical resources not described in said database.

12. The method as claimed in claim 11, wherein said trail data describing an actual network trail is received from at least one network element selected from the group consisting of switches, cross connects, regenerators, repeaters, transmission links, and is subject to an accept/reject decision for either accepting said trail or rejecting said trail for network management.

13. The method as claimed in claim 12, wherein said trail data describing a plurality of planned trails is input from a user interface.

14. A network management system capable of managing a plurality of end to end trails, each comprising a transport entity for the simultaneous transfer of information in opposite directions between respective inputs and outputs, said management system comprising:

a database containing descriptions of said plurality of trails in which each said trail is represented in terms of a state model by a corresponding respective tail data describing at least one of a plurality of states applicable to that trail; and consistency check means for ensuring consistency of trails with the trail data stored in said database wherein trail data is capable of modification so as to transition between the states, wherein said state applicable to a trail is selected from a set consisting of:
 a state representing a condition in which said trail is provisioned in a network;
 a state representing a condition in which said trail is un-provisioned in a network;
 a state representing a condition in which said trail is supporting at least one client trail; and
 a state representing a condition in which said trail is present in a network, but which has not been accepted or rejected by the network management system.

15. The network management system as claimed in claim 14, comprising an interface capable of receiving signals describing an existing network trail.

16. The network management system as claimed in claim 14, comprising an interface capable of receiving signals describing a de-enrollment of a network trail.

17. The network management system as claimed in claim 14, comprising an interface capable of receiving signals describing a network connection.

18. The network management system as claimed in claim 14, wherein said database comprises, for each of a plurality of trails, a corresponding respective trail object, and said plurality of states are represented as attributes of said trail object.

19. A network management system capable of managing a plurality of end to end trails, each comprising a transport entity for the simultaneous transfer of information in opposite directions between respective inputs and outputs, said management system comprising:

at least one element controller means capable of controlling a plurality of network elements by sending and receiving signals over an operations, administration and maintenance channel; and a network controller capable of communicating with said element controller means for sending and receiving messages concerning said plurality of trails, network controller comprising a database containing descriptions of said plurality of trails in which each said trail is represented by a corresponding respective trail data describing at least one of a plurality of states applicable to that trail;

consistency check means for ensuing consistency of trails with the trail data stored in said database wherein the trail data is capable modification so as to transition between the states, wherein said state applicable to a trail is selected from a set consisting of:
 a state representing a condition in which said trail is provisioned in a network;
 a state representing a condition in which said trail is un-provisioned in a network;
 a state representing a condition in which said trail is supporting at least one client trail; and
 a state representing a condition in which said trail is present in a network, but which has not been accepted or rejected by the network management system.

20. The network management system as claimed in claim 14, wherein said network controller performs a trail audit process for checking states of all trails managed by said system by:

sending a request signal to said element controller to request a list of all network trails supported by a plurality of network elements controlled by said element controller;

said element controller issuing interrogation signals over an operations, administration and maintenance channel for interrogation of a plurality of network elements;

said element controller recovering a plurality of response signals describing trails supported by said network elements; and said element controller sending to said network controller signals describing a plurality of network trails supported by said network elements controlled by said element controller.

* * * * *